(12) United States Patent
Itaya et al.

(10) Patent No.: US 9,699,639 B2
(45) Date of Patent: Jul. 4, 2017

(54) INFORMATION PROCESSING DEVICE, INFORMATION PROCESSING METHOD AND PROGRAM

(71) Applicant: SONY CORPORATION, Tokyo (JP)

(72) Inventors: Natsuki Itaya, Tokyo (JP); Kazuyuki Sakoda, Chiba (JP); Nobuhiko Watanabe, Kanagawa (JP); Mitsuru Takehara, Tokyo (JP); Takatoshi Nakamura, Tokyo (JP); Masayuki Takada, Tokyo (JP); Shuhei Sonoda, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/031,728

(22) PCT Filed: Aug. 18, 2014

(86) PCT No.: PCT/JP2014/071571
§ 371 (c)(1),
(2) Date: Apr. 23, 2016

(87) PCT Pub. No.: WO2015/072199
PCT Pub. Date: May 21, 2015

(65) Prior Publication Data
US 2016/0249199 A1 Aug. 25, 2016

(30) Foreign Application Priority Data

Nov. 15, 2013 (JP) ................................. 2013-236375

(51) Int. Cl.
*H04B 7/00* (2006.01)
*H04W 8/00* (2009.01)
(Continued)

(52) U.S. Cl.
CPC .......... *H04W 8/005* (2013.01); *H04B 17/318* (2015.01); *H04W 4/023* (2013.01);
(Continued)

(58) Field of Classification Search
CPC ....... H04W 4/008; H04W 64/00; H04W 8/24; H04W 76/02; H04W 4/02; H04W 84/18;
(Continued)

(56) References Cited

U.S. PATENT DOCUMENTS

| 8,005,054 B2 * | 8/2011 | Isozu | H04L 45/10 370/328 |
| 2011/0252090 A1 * | 10/2011 | Garcia, Jr. | H04L 12/1827 709/204 |

FOREIGN PATENT DOCUMENTS

| JP | 2003-134127 A | 5/2003 |
| JP | 2005-278044 A | 10/2005 |

(Continued)

*Primary Examiner* — Keith Ferguson
(74) *Attorney, Agent, or Firm* — Chip Law Group

(57) ABSTRACT

Disconnection from a network is easily recognized.
A plurality of information processing devices connected over a network is disclosed. The network is built through wireless communication of the plurality of information processing devices. The plurality of information processing devices includes at least a first information processing device and a second information processing device. A detection unit of the first information processing device is configured to detect the second information processing device that is disconnected from the network. A control unit of the first information processing device is configured to output first information about the detected second information processing device as disconnection information.

18 Claims, 15 Drawing Sheets

(51) Int. Cl.
*H04W 76/06* (2009.01)
*H04W 60/06* (2009.01)
*H04B 17/318* (2015.01)
*H04W 4/02* (2009.01)
*H04W 4/00* (2009.01)
*H04W 84/18* (2009.01)

(52) U.S. Cl.
CPC ........... *H04W 60/06* (2013.01); *H04W 76/06* (2013.01); *H04W 4/008* (2013.01); *H04W 84/18* (2013.01)

(58) Field of Classification Search
CPC ....... H04W 84/12; H04W 4/08; H04W 88/04; H04W 76/025; H04W 76/043; H04W 48/16
USPC .... 455/500, 517, 518, 519, 458, 456.1–457, 455/426.1, 426.2, 414.1–414.4, 434, 455/422.1, 403, 550.1, 67.11, 423–425; 370/338, 254, 328, 242, 260
See application file for complete search history.

(56) References Cited

FOREIGN PATENT DOCUMENTS

| | | |
|---|---|---|
| JP | 2007-088943 A | 4/2007 |
| JP | 2007-158733 A | 6/2007 |
| JP | 2008-311702 A | 12/2008 |
| JP | 2009-239385 A | 10/2009 |
| JP | 2010-098687 A | 4/2010 |
| JP | 2011-259056 A | 12/2011 |
| WO | 2013/145324 A | 10/2013 |

\* cited by examiner

FIG. 3

TERMINAL LIST
300

| IDENTIFICATION INFORMATION | SIGNAL LEVEL | ... |
|---|---|---|
| 1001 | ... | ... |
| 1002 | ... | ... |
| 1003 | ... | ... |
| 1004 | ... | ... |

FIG. 5
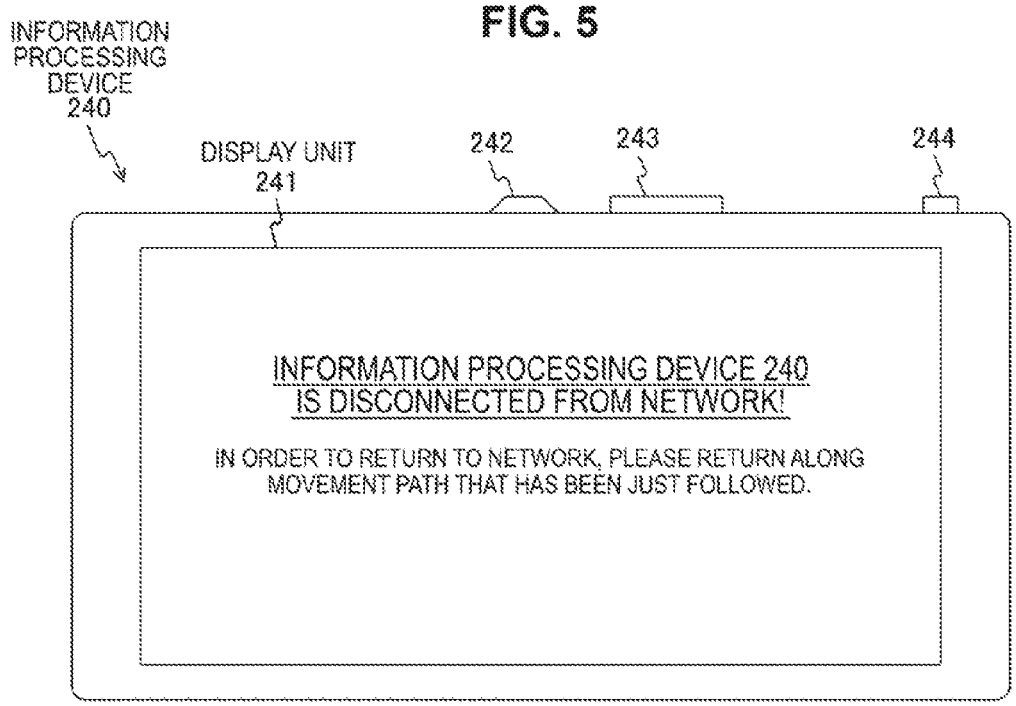
a
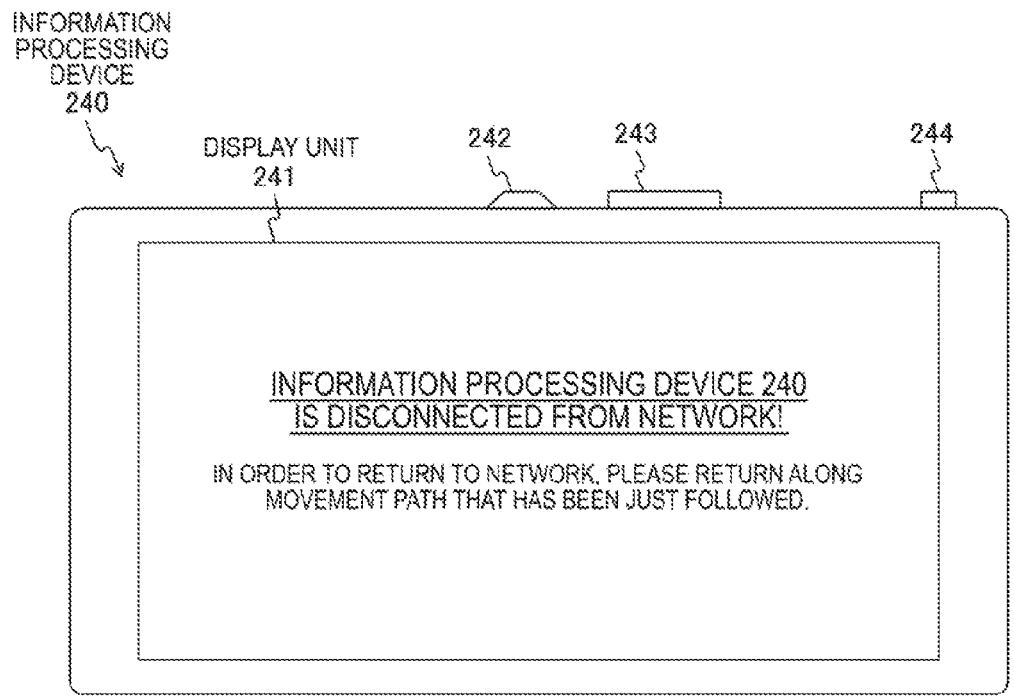
b

FIG. 6
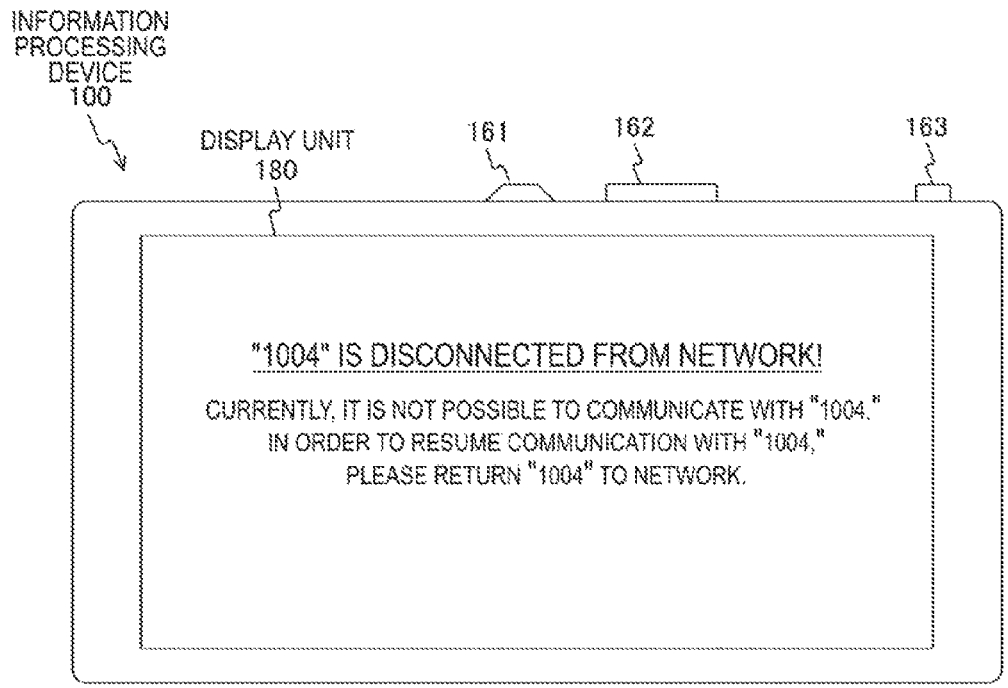
a
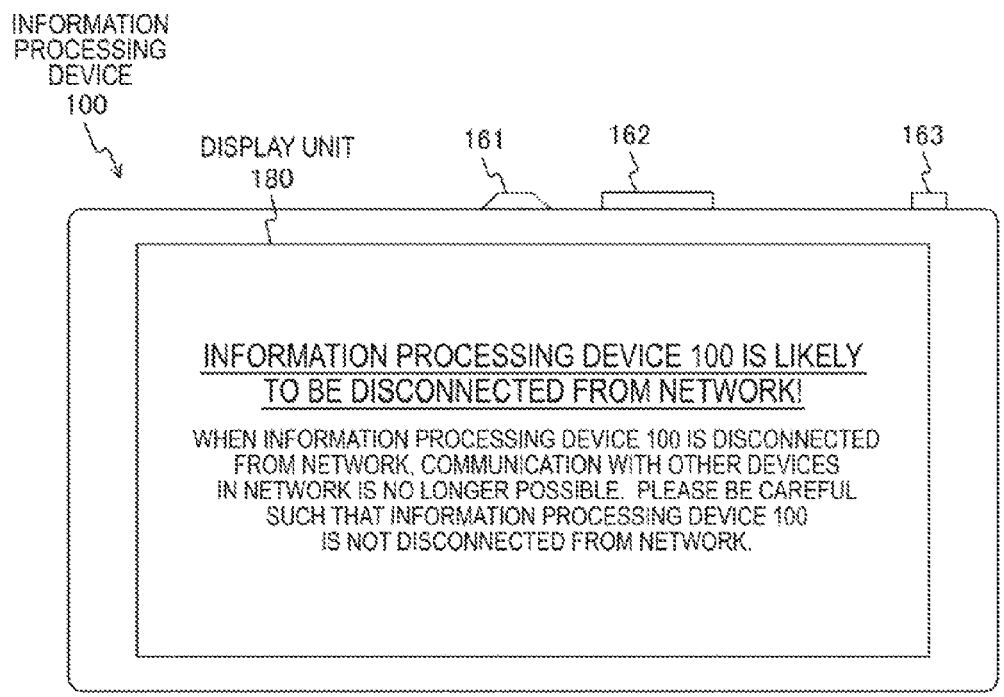
b

FIG. 7
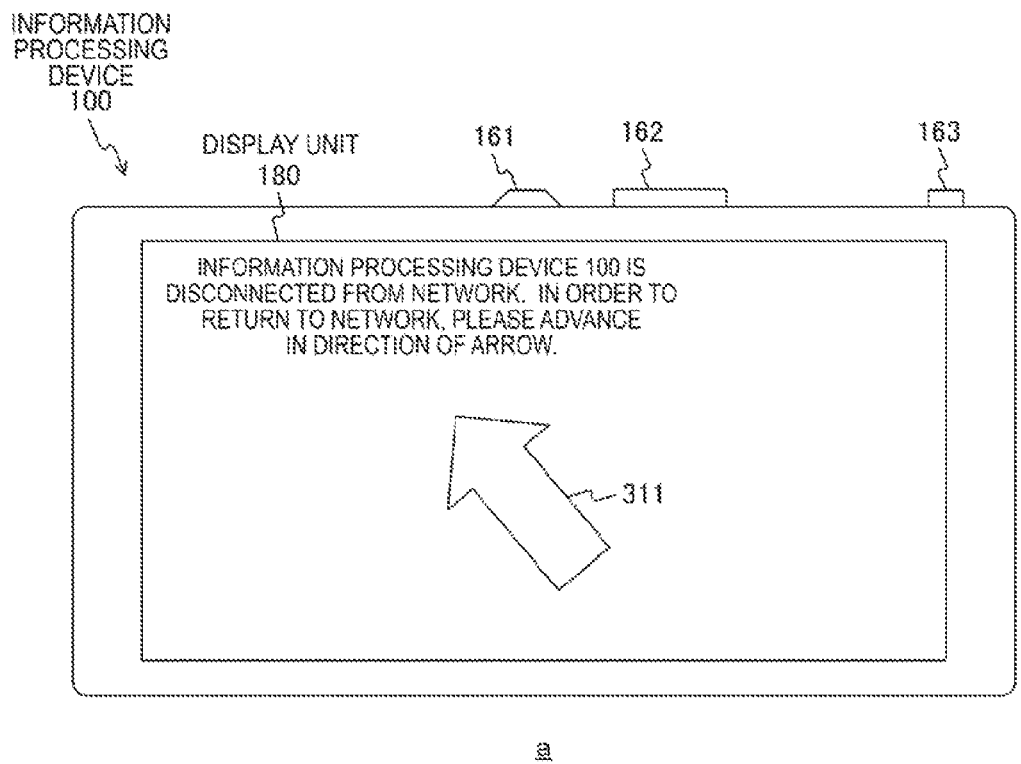
a
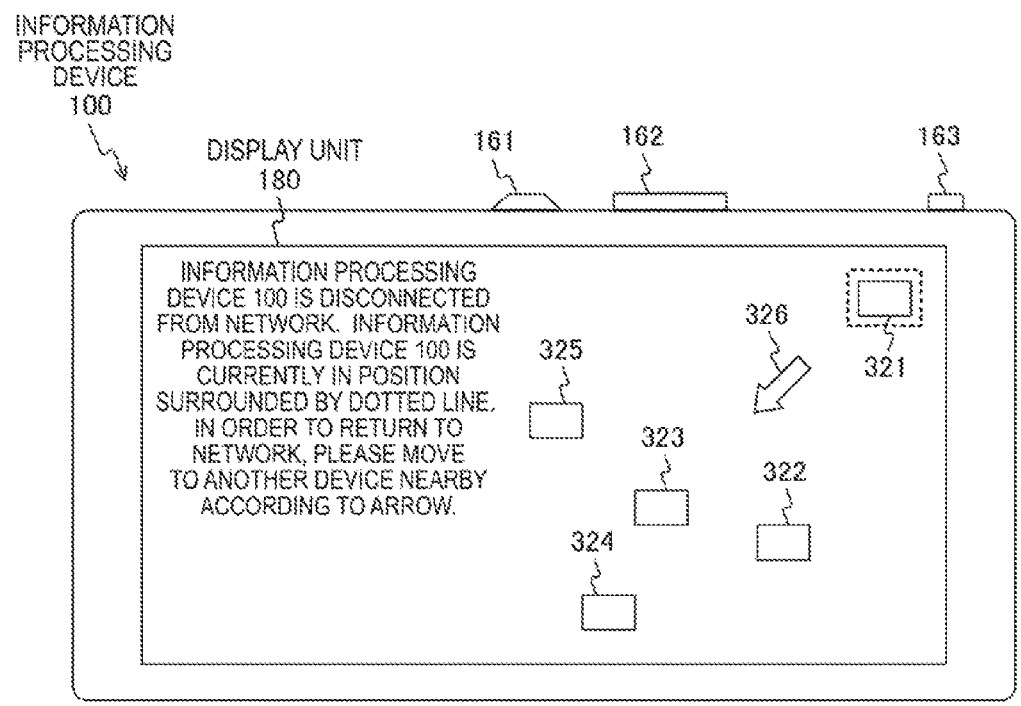
b

FIG. 11
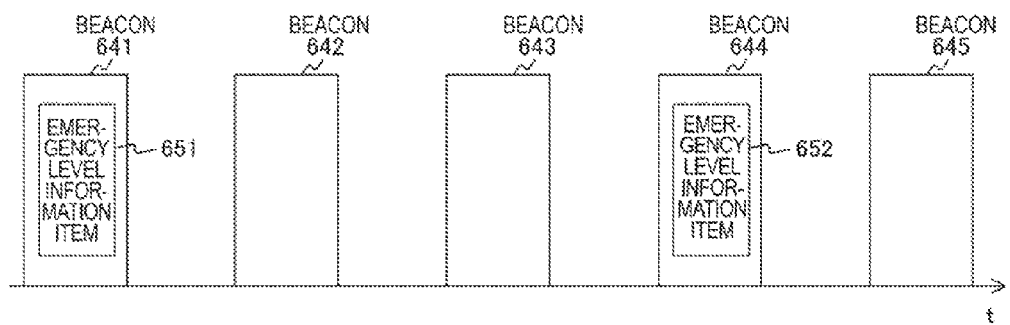
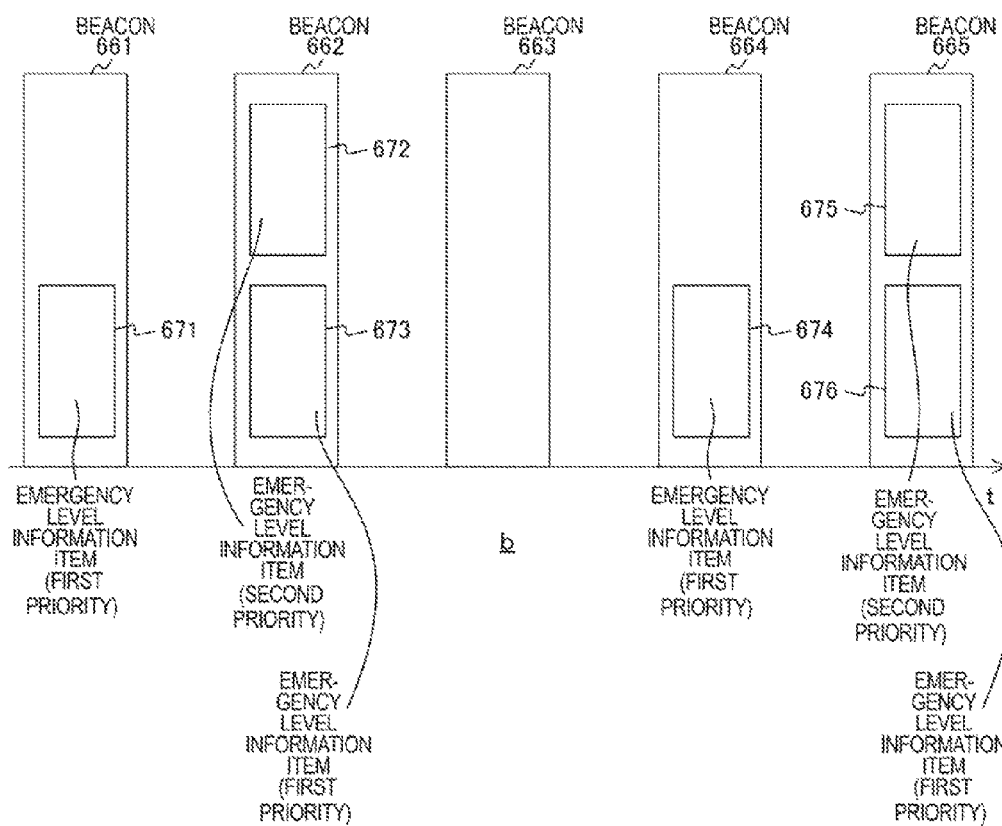

INFORMATION PROCESSING DEVICE, INFORMATION PROCESSING METHOD AND PROGRAM

CROSS REFERENCE TO RELATED APPLICATIONS

This application is a U.S. National Phase of International Patent Application No. PCT/JP2014/071571 filed on Aug. 18, 2014, which claims priority benefit of Japanese Patent Application No. JP 2013-236375 filed in the Japan Patent Office on Nov. 15, 2013, Each of the above-referenced applications is hereby incorporated herein by reference in its entirety.

TECHNICAL FIELD

The present technology relates to an information processing device, and specifically, to an information processing device configured to exchange various pieces of information using wireless communication, an information processing method thereof and a program causing a computer to execute the method.

BACKGROUND ART

In the related art, wireless communication technologies in which wireless communication is used to exchange various types of data are provided. For example, a communication method (for example, ad hoc communication or an ad hoc network) in which autonomous interconnection is performed with an approaching information processing device is proposed (for example, refer to Patent Literature 1).

CITATION LIST

Patent Literature

Patent Literature 1: JP 2009-239385A

SUMMARY OF INVENTION

Technical Problem

According to the above-described technologies of the related art, it is possible to exchange various types of data between two information processing devices using wireless communication without wired line connection. In addition, in such a network, the information processing devices can communicate with an approaching information processing device without depending on a master station such as a control device. Further, in an ad hoc network, when a new information processing device appears nearby, the new information processing device can also freely participate in the network. Therefore, it is possible to increase coverage of the network according to an increased number of information processing devices nearby.

In addition, each information processing device can transfer information exchanged with other information processing devices in a bucket brigade manner (a so-called multi-hop•relay) in addition to autonomously interconnecting with an approaching information processing device. In addition, a network in which multi-hop is performed is generally known as a mesh network.

In this manner, in the ad hoc network or the mesh network, it is possible to freely communicate with a nearby information processing device. In addition, by connecting with the nearby information processing device, the network can be extended. Here, for example, a case in which an information processing device belonging to the network moves to a place in which there are no other information processing devices nearby is assumed. In this case, there are concerns, for example, the information processing device may be outside of a range that radio waves from other information processing devices reach, and communication with other information processing devices belonging to the network may be impossible. Therefore, it is important to easily recognize disconnection from the network and to prevent disconnection from the network.

The present technology has been made in view of the above-described problems, and is provided to easily recognize disconnection from a network.

Solution to Problem

The present technology is achieved to solve the technical problem, and a first aspect thereof provides an information processing device, an information processing method thereof, and a program causing a computer to execute the information processing method, the information processing device including: a detection unit configured to detect an information processing device that is disconnected from a network built through autonomous wireless communication of a plurality of information processing devices; and a control unit configured to perform control such that information about the detected information processing device is output as disconnection information. Accordingly, there is provided an operation in which information about the information processing device whose disconnection from the network is detected is output as disconnection information.

According to the first aspect, the detection unit may detect whether the information processing device is disconnected from the network. The control unit may perform control such that, when the disconnection is detected, the disconnection information indicating a fact that the information processing device is disconnected is output. Accordingly, there is provided an operation in which it is detected whether a subject device is disconnected from the network, and when the disconnection is detected, disconnection information indicating the fact that the subject device is disconnected is output.

According to the first aspect, the control unit may perform control such that, when the disconnection is detected, information for the information processing device to return to the network is output. Accordingly, there is provided an operation in which, when disconnection from the network is detected, information for the subject device to return to the network is output.

According to the first aspect, the control unit may perform control such that, as the information for returning, at least one of a label indicating an advancing direction for the information processing device to return to the network, and a label indicating a relative positional relation between the information processing device and other information processing devices belonging to the network is displayed. Accordingly, there is provided an operation in which at least one of a label indicating an advancing direction for the subject device to return to the network and a label indicating a relative positional relation between the subject device and the other information processing devices belonging to the network is displayed.

According to the first aspect, the detection unit may detect whether another information processing device belonging to the network is disconnected from the network. The control unit may perform control such that, when the disconnection is detected, the disconnection information indicating a fact that the other information processing device is disconnected is output. Accordingly, there is provided an operation in which it is detected whether another information processing device belonging to the network is disconnected from the network, and when the disconnection is detected, disconnection information indicating the fact that the other information processing device is disconnected is output.

According to the first aspect, the control unit may perform control such that information about a relative position with other information processing devices belonging to the network is acquired, and a relative positional relation between the information processing device and the detected information processing device based on the information is displayed. Accordingly, there is provided an operation in which information about a relative position with other information processing devices belonging to the network is acquired, and a relative positional relation between the subject device and the information processing device whose disconnection is detected based on the information is displayed.

According to the first aspect, the control unit may perform control such that, based on position information about a position of the information processing device, labels indicating the information processing device and the detected information processing device are arranged and displayed on a map including the position of the information processing device. Accordingly, there is provided an operation in which, based on position information about a position of the subject device, labels indicating the subject device and the information processing device whose disconnection is detected are arranged and displayed on the map including the position of the subject device.

According to the first aspect, the control unit may perform control such that specific information for confirming presence of the detected information processing device is transmitted to another information processing device belonging to a network other than the network. Accordingly, there is provided an operation in which specific information for confirming the presence of the information processing device whose disconnection is detected is transmitted to other information processing devices belonging to a network other than the network.

According to the first aspect, when the presence of the detected information processing device is confirmed in the other network, the other information processing device may transmit information including a fact that the presence of the detected information processing device is confirmed as response information for the specific information. The control unit may perform control such that, when the response information is received, the disconnection information indicating the fact that the presence of the detected information processing device is confirmed in the other network is output. Accordingly, there is provided an operation in which, when the presence of the information processing device whose disconnection is detected is confirmed in the other network, the other information processing device transmits information (response information) including the fact that the presence is confirmed, and when the response information is received, the subject device outputs disconnection information indicating the fact that the presence of the information processing device whose disconnection is detected is confirmed in the other network.

According to the first aspect, the detection unit may detect an information processing device that is not disconnected from the network but is likely to be disconnected. The control unit may perform control such that, when the information processing device that is likely to be disconnected is detected, the disconnection information indicating a fact that the information processing device that is likely to be disconnected is detected is output. Accordingly, there is provided an operation in which an information processing device that is not disconnected from the network but is likely to be disconnected is detected, and when the information processing device that is likely to be disconnected is detected, disconnection information indicating the fact that the information processing device that is likely to be disconnected is detected is output.

According to the first aspect, when there is a first information processing device whose signal strength is less than a threshold and there is no second information processing device whose signal strength is equal to or greater than a threshold among other information processing devices belonging to the network, the detection unit may detect the information processing device as the information processing device that is likely to be disconnected. Accordingly, there is provided an operation in which, when there is a first information processing device whose signal strength is less than a threshold and there is no second information processing device whose signal strength is equal to or greater than a threshold among other information processing devices belonging to the network, the subject device is detected as the information processing device that is likely to be disconnected.

According to the first aspect, the detection unit may detects the information processing device that is disconnected using list information in which identification information for identifying each of the plurality of information processing devices is retained. Accordingly, there is provided an operation in which an information processing device that is to be disconnected is detected using the list information.

According to the first aspect, the list information may include the identification information about at least one information processing device of an information processing device that is able to directly communicate with the information processing device and an information processing device that is able to perform communication through an information processing device other than the information processing device. Accordingly, there is provided an operation in which an information processing device that is to be disconnected is detected using list information including identification information about at least one information processing device of an information processing device that is able to directly communicate with the subject device and an information processing device that is able to communicate with an information processing device other than the subject device.

According to the first aspect, when an information processing device disconnected from the network is detected using the list information, the control unit may confirm presence of the detected information processing device based on presence information that is information received from another information processing device belonging to a network other than the network, is transmitted in response to specific information for confirming the presence of the detected information processing device and indicates a fact that a beacon from the detected information processing device is detected. Accordingly, there is provided an operation in which, when the information processing device disconnected from the network is detected using the list information, the presence of the detected information processing device is confirmed based on presence information received from the other information processing device belonging to the other network.

According to the first aspect, when a beacon is not detected from any of the plurality of information processing devices for a predetermined time, the detection unit may detect that the information processing device is disconnected from the network. Accordingly, there is provided an operation in which, when a beacon is not detected from any of the plurality of information processing devices for a predetermined time, it is detected that the subject device is disconnected from the network.

Advantageous Effects of Invention

According to an embodiment of the present technology, an excellent effect in which disconnection from a network can be easily recognized can be obtained. Note that, effects described herein are not necessarily limited, and any effect described in the present disclosure may be achieved.

BRIEF DESCRIPTION OF DRAWINGS

FIG. 3 is a diagram illustrating an exemplary terminal list (a terminal list 300) that the information processing device 100 in the first embodiment of the present technology retains.

FIG. 5 is a diagram illustrating a notification example when disconnection of the information processing device 240 in the first embodiment of the present technology is notified of.

FIG. 6 is a diagram illustrating a notification example of notification that an information processing device is disconnected or is likely to be disconnected in the first embodiment of the present technology.

FIG. 7 is a diagram illustrating an exemplary display screen displayed on a display unit 180 in the first embodiment of the present technology.

FIG. 11 is a diagram illustrating a transmission example when information processing devices of the communication system 20 in the second embodiment of the present technology transmit an emergency information item.

DESCRIPTION OF EMBODIMENTS

Hereinafter, a form (hereinafter referred to as an "embodiment") for implementing the present technology will be described. The description will proceed in the following order.
1. First embodiment (an example in which information processing devices belonging to the same network detect disconnection (or a possibility of disconnection) of a subject device or another device and output disconnection information indicating that fact)
2. Second embodiment (an example in which the presence of an information processing device disconnected from the same network is inquired of information processing devices belonging to another network, and the presence of the disconnected information processing device is confirmed)
3. Application example <1. First Embodiment>

[Configuration Example of Communication System]

Figure 1:
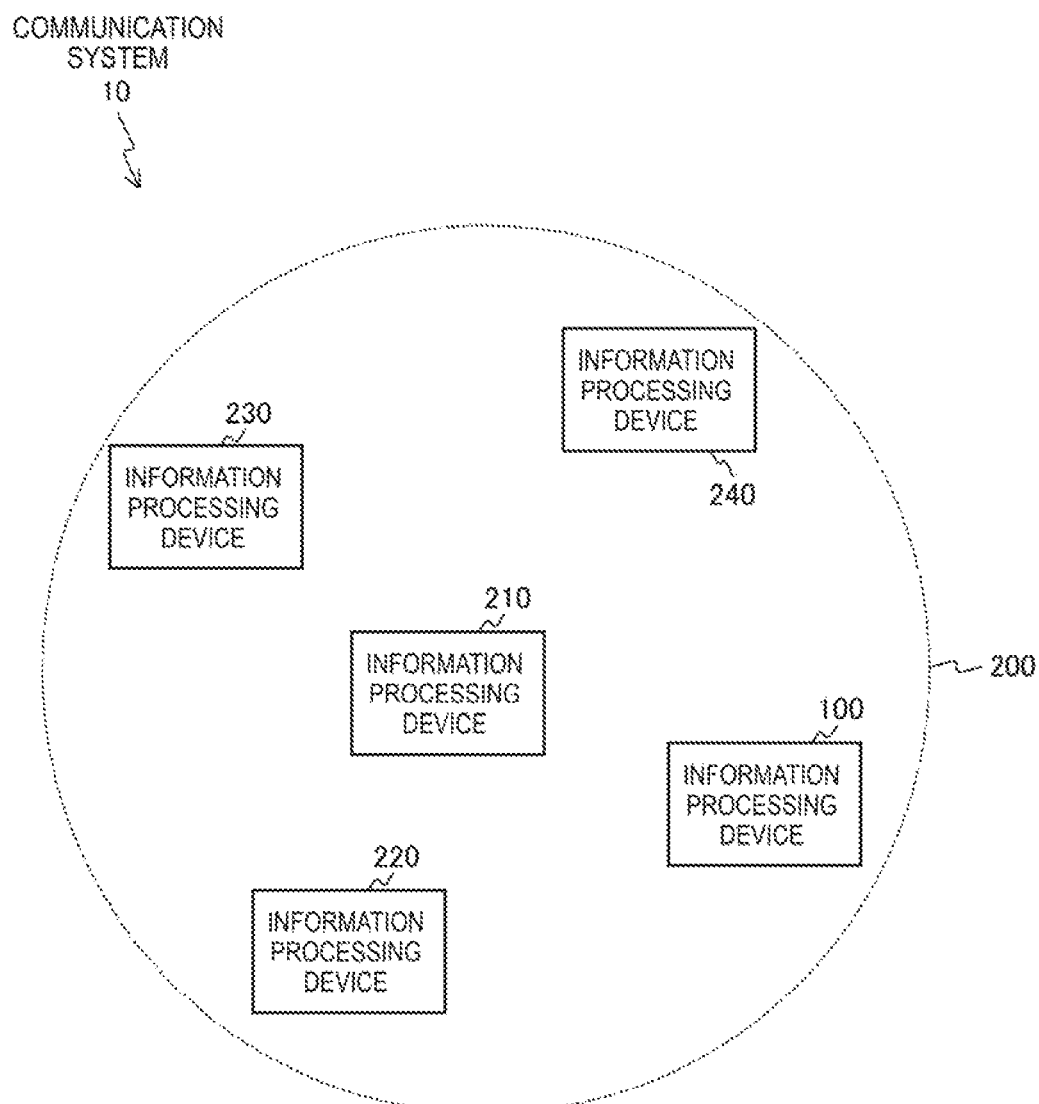
FIG. 1 is a diagram illustrating an exemplary system configuration of a communication system 10 in a first embodiment of the present technology.

FIG. 1 is a diagram illustrating a system configuration example of a communication system 10 in the first embodiment of the present technology.

The communication system 10 includes a plurality of information processing devices (information processing devices 100, 210, 220, 230, and 240). The information processing devices of the communication system 10 are, for example, portable information processing devices or fixed-type information processing devices having a wireless communication function. Note that, the portable information processing device is an information processing device, for example, a smartphone, a mobile phone, a tablet terminal, a game device, a reproducing device (reproducing an image or reproducing music), or an image capturing device. In addition, the fixed-type information processing device is an information processing device (for example, an information processing device that is connected to a power source when used), for example, a printer, a personal computer, a television, and various consumer electronics.

For example, the information processing devices 100, 210, 220, 230, and 240 belong to the same network in L2 (a second layer), and the information processing devices can communicate with each other in L3 (a third layer) or higher as necessary. For example, in a mesh network in which Institute of Electrical and Electronics Engineers (IEEE) 802.11S is used, the same service set identifier (SSID) and passphrase are used. In addition, when an L3 network mechanism such as Internet Protocol (IP) is used, the devices can communicate with each other in any place in the network.

In addition, the information processing devices belonging to the same network can connect from anywhere as long as the information processing device is in a range that radio waves reach. For example, in the mesh network in which IEEE 802.11S is used, when the information processing device belonging to the same network is in the range that radio waves reach, since the information processing device can connect, it is possible to obtain connectivity for an entire network.

Here, as a communication method in which autonomous interconnection is performed with an approaching information processing device, ad hoc communication, an ad hoc network, and a mesh network are known. In such a network, the information processing devices can communicate with an approaching information processing device without depending on a master station (for example, a control device).

For example, by a communication method such as Wireless Fidelity (Wi-Fi, registered trademark) or Bluetooth (registered trademark), autonomous interconnection can be performed with the approaching information processing device.

For example, the mesh network in which IEEE 802.11S is used has a characteristic in which a relation between devices is equal. That is, the mesh network in which IEEE 802.11S is used can build a mesh network having no master-slave relation such as Wi-Fi. In addition, the mesh network in which IEEE 802.11S is used has a characteristic in which path selection can be automatically switched. That is, in the mesh network in which IEEE 802.11S is used, when any link is disconnected, switching to a route in which the other link is used can be automatically performed. In addition, the mesh network in which IEEE 802.11S is used has a characteristic in which transmission power can be controlled. That is, in the mesh network in which IEEE 802.11S is used, by controlling transmission power of each of the information processing devices, it is possible to change a distance reached and a communication speed. In addition, the mesh network in which IEEE 802.11S is used has a characteristic in which it is possible to perform time synchronization between the information processing devices. For example, in the mesh network in which IEEE 802.11S is used, it is possible to implement millisecond-order time synchronization.

Therefore, in the embodiment of the present technology, as a communication method in which autonomous interconnection is performed with an approaching information processing device, the mesh network in which IEEE 802.11S is used (the ad hoc network) will be exemplified.

For example, in the ad hoc network, when a new information processing device is added nearby, the new information processing device can also freely participate in the network. For example, initially, among information processing devices illustrated in FIG. 1, only the information processing device 100, the information processing device 210, and the information processing device 220 are assumed to participate in the ad hoc network. In this case, the information processing device 230 and the information processing device 240 are assumed to be sequentially added. In this case, it is possible to increase coverage of the network according to an increased number of such information processing devices (approaching information processing devices). That is, it is possible to increase coverage of the network according to sequential addition of the information processing device 230, and the information processing device 240.

Here, the information processing devices can transfer information exchanged with other information processing devices in a bucket brigade manner in addition to autonomously interconnecting with the approaching information processing device.

For example, it is assumed that the information processing device 100 can directly communicate with the information processing devices 210, 220, and 240 but are unable to directly communicate with the information processing device 230 due to radio waves not reaching.

Even when direct communication may be impossible in this manner, the information processing devices (the information processing devices 210, 220, and 240) that can directly communicate with the information processing device 100 can transfer data of the information processing device 100 to the information processing device 230. Therefore, by transferring data in this manner, the information processing device 100 and the information processing device 230 that are unable to directly communicate with the information processing device 100 can exchange information through any of the information processing devices 210, 220, and 240.

A method in which data transfer (so-called bucket brigade) is performed with one other in this manner, and information is delivered to a remote information processing device is called a multi-hop•relay. In addition, a network in which multi-hop is performed is generally known as a mesh network.

Note that, in FIG. 1, a network 200 such as an ad hoc network or a mesh network is schematically illustrated as a circle with a dotted line. In addition, FIG. 2 illustrates a configuration of an information processing device belonging to the network 200.

[Functional Configuration Example of Information Processing Device]

Figure 2:
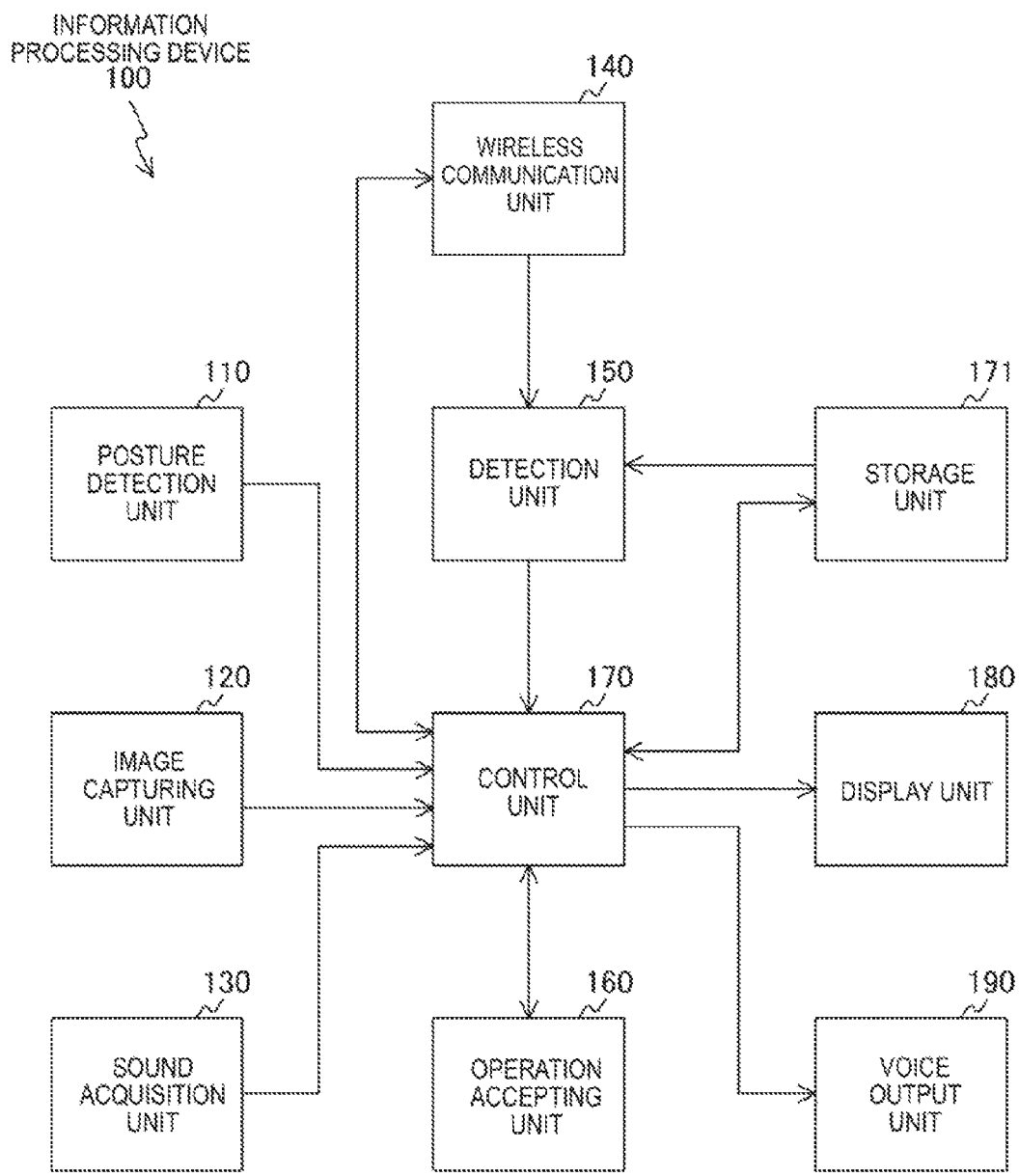
FIG. 2 is a block diagram illustrating an exemplary function and configuration of an information processing device 100 in the first embodiment of the present technology.

FIG. 2 is a block diagram illustrating a functional configuration example of the information processing device 100 in the first embodiment of the present technology.

The information processing device 100 includes a posture detection unit 110, an image capturing unit 120, a sound acquisition unit 130, a wireless communication unit 140, a detection unit 150, an operation accepting unit 160, a control unit 170, a storage unit 171, a display unit 180, and a voice output unit 190.

The posture detection unit 110 detects a change (including movement of the information processing device 100) of a posture of the information processing device 100 by detecting an acceleration, a motion, and a tilt of the information processing device 100, and outputs change information about the detected posture change to the control unit 170. Note that, as the posture detection unit 110, for example, an acceleration sensor, a geomagnetic sensor, a gyro sensor, or a global positioning system (GPS) can be used. For example, the posture detection unit 110 uses position information (for example, a latitude and a longitude) detected using GPS and can obtain a moving distance (for example, a moving distance per unit time) and a moving direction of the information processing device 100. In addition, for example, the posture detection unit 110 can obtain a moving distance and a moving direction using an acceleration sensor. In addition, for example, the posture detection unit 110 can obtain an orientation using a geomagnetic sensor.

The image capturing unit 120 generates an image (image data) by capturing a subject and outputs the generated image to the control unit 170. The image capturing unit 120 includes, for example, an optical system (a plurality of lenses), an image capturing element, and a signal processing unit.

The sound acquisition unit 130 acquires sound near the information processing device 100, and outputs the acquired sound data (sound) to the control unit 170. Also, the sound acquisition unit 130 is implemented by, for example, a microphone.

The wireless communication unit 140 transmits and receives information to and from with other information processing devices (for example, the information processing devices 210, 220, and 230) using wireless communication based on control of the control unit 170. As described above, the embodiment of the present technology exemplifies a case in which the wireless communication unit 140 performs communication using IEEE 802.11S protocol.

However, the wireless communication unit 140 may perform wireless communication according to other wireless communication specifications. For example, a wireless local area network (LAN) can be used. As the wireless LAN, for example, Wi-Fi (for example, IEEE 802.11n) can be used. In addition, as the wireless communication, wireless communication such as near field communication (NFC), Bluetooth (registered trademark), visible light communication, infrared communication and portable radio wave communication can be used. In addition, as the wireless communication, for example, millimeter wave communication (such as 60 GHz), 900 MHz/2.4 GHz/5 GHz wireless LAN, or ultra wide band (UWB) can be used.

Note that, the wireless communication unit 140 may perform wireless communication using radio waves (electromagnetic waves), or perform wireless communication (for example, wireless communication that is performed using a magnetic field) using a medium other than radio waves. In addition, the wireless communication unit 140 may include a connection function to a public network such as 3rd Generation (3G) or Wi-Fi service areas.

For example, the wireless communication unit 140 exchanges a signal for generating or updating a multi-hop communication route using wireless communication with other information processing devices based on control of the control unit 170.

The detection unit 150 detects an information processing device that is disconnected from a network built through autonomous wireless communication of a plurality of information processing devices based on information from the wireless communication unit 140, and outputs the detection result to the control unit 170.

For example, the detection unit 150 can detect whether a subject device (the information processing device 100) is disconnected from the network. In addition, the detection unit 150 can detect whether another information processing device belonging to the network is disconnected from the network. In addition, the detection unit 150 can detect an information processing device that is not disconnected from the network but is likely to be disconnected.

The operation accepting unit 160 is an operation accepting unit configured to accept an operation input performed by a user, and outputs operation information corresponding to the content of the accepted operation input to the control unit 170. The operation accepting unit 160 is implemented by, for example, a touch panel, a keyboard, and a mouse.

The control unit 170 controls units of the information processing device 100 based on a control program stored in the storage unit 171. For example, the control unit 170 performs signal processing on transmitted and received information. In addition, the control unit 170 is implemented by, for example, a central processing unit (CPU).

In addition, for example, the control unit 170 can determine whether an information processing device disconnected from the network is detected based on the detection result output from the detection unit 150. Therefore, when the information processing device disconnected from the network is detected, the control unit 170 performs control such that information about the detected information processing device is output as disconnection information. For example, the control unit 170 can alert the user that the information processing device disconnected from the network is detected using an image display by the display unit 180 or a voice output from the voice output unit 190.

In addition, the control unit 170 sequentially records images generated by the image capturing unit 120 or voices acquired by the sound acquisition unit 130 in the storage unit 171, and when the information processing device disconnected from the network is detected, can output these pieces of information (images and voices). In addition, the control unit 170 sequentially transmits these pieces of information (images and voices) to other information processing devices through the wireless communication unit 140, and when the information processing device disconnected from the network is detected, can output these pieces of information from the other information processing devices.

The storage unit 171 is a memory configured to store various pieces of information. For example, various pieces of information (for example, a control program) necessary for the information processing device 100 to perform a desired operation are stored in the storage unit 171. In addition, for example, a terminal list 300 illustrated in FIG. 3 is stored in the storage unit 171. In addition, images (image data) generated by the image capturing unit 120 or sound (voice data) acquired by the sound acquisition unit 130 are stored in the storage unit 171.

For example, when data is transmitted using wireless communication, the control unit 170 processes information read from the storage unit 171 and generates a data block (a transmission packet) to be actually transmitted. Next, the control unit 170 outputs the generated transmission packet to the wireless communication unit 140. In addition, the wireless communication unit 140 converts the transmission packet into a format of a communication scheme for actual transmission, and then transmits the converted transmission packet from an antenna (not illustrated) to the outside.

In addition, for example, when wireless communication is used to receive data, the wireless communication unit 140 extracts a reception packet through signal processing performed on a radio wave signal received through the antenna (not illustrated) by a receiver in the wireless communication unit 140. Therefore, the control unit 170 interprets the extracted reception packet. When it is determined that data should be retained based on the interpretation result, the control unit 170 writes the data in the storage unit 171. In addition, when it is determined that data should be transferred to other information processing devices, the control unit 170 outputs the data to the wireless communication unit 140 as a transmission packet to be transferred to the other information processing devices.

The display unit 180 is a display unit configured to display various pieces of information based on control of the control unit 170. Note that, as the display unit 180, for example, a display panel such as an organic electro luminescence (EL) panel and a liquid crystal display (LCD) panel can be used. Note that, the operation accepting unit 160 and the display unit 180 can be integrally formed using a touch panel through which the user can perform an operation input by contacting or approaching a display surface with a finger.

The voice output unit 190 is a voice output unit configured to output various voices based on control of the control unit 170. Note that, the voice output unit 190 is implemented by, for example, a speaker.

In this manner, the information processing device 100 can record an image generated by capturing a subject in the storage unit 171, record the acquired voice in the storage unit 171, and reproduce information (for example, image data and voice data) recorded in the storage unit 171.

Note that, since a functional configuration of other information processing devices (the information processing devices 210, 220, 230, and 240) is substantially the same as that of the information processing device 100, description thereof will be omitted herein. However, components such as the image capturing unit 120, the storage unit 171, the display unit 180, and the voice output unit 190 may differ in each information processing device according to a service available on the built network.

[Management Example of Terminal Information]

FIG. 3 is a diagram illustrating an exemplary terminal list (the terminal list 300) that the information processing device 100 in the first embodiment of the present technology retains.

The terminal list 300 is a list in which information for managing other information processing devices belonging to the same network is retained. That is, information (terminal information) about all or some information processing devices belonging to the same network is stored in the terminal list 300. In addition, for example, identification information 301 and a signal level 302 are stored in association in the terminal list 300.

The identification information 301 is identification information (terminal identification information) for identifying other information processing devices belonging to the network. As the identification information, for example, a media access control (MAC) address can be used. In addition, for example, application-specific identification information may be used.

Note that, in FIG. 3, for simplicity of description, as identification information, only numbers 1001, 1002, 1003, and 1004 are simply shown. For example, the number "1001" in the identification information 301 refers to identification information for identifying the information processing device 210. The number "1002" in the identification information 301 refers to identification information for identifying the information processing device 220. Similarly, the number "1003" in the identification information 301 refers to identification information for identifying the information processing device 230. The number "1004" in the identification information 301 refers to identification information for identifying the information processing device 240.

The signal level 302 is a signal level acquired by communication with information processing devices belonging to the network.

For example, the control unit 170 regularly or irregularly acquires information (for example, the MAC address and the signal level) about other information processing devices communicating through the wireless communication unit 140, and updates content of the terminal list 300 using the acquired information.

For example, the control unit 170 can store information about all information processing devices belonging to the same network in the terminal list 300. In addition, for example, the control unit 170 may store information about some information processing devices among information processing devices belonging to the same network in the terminal list 300. Note that, some information processing devices stored in the terminal list 300 can be, for example, at least one of an information processing device that can directly communicate with the information processing device 100 and an information processing device that can perform communication through other information processing devices.

In addition, for example, the detection unit 150 can detect an information processing device disconnected from the network using the terminal list 300.

Also, while FIG. 3 illustrates an example in which the identification information 301 and the signal level 302 are stored in association in the terminal list 300, and other information may be stored in association. For example, information about the user (information about the user, for example, a name and a nickname of the user) who possesses the information processing device may be stored in association with the information processing device.

[Detection Example of Information Processing Device Disconnected from Network]

Figure 4:
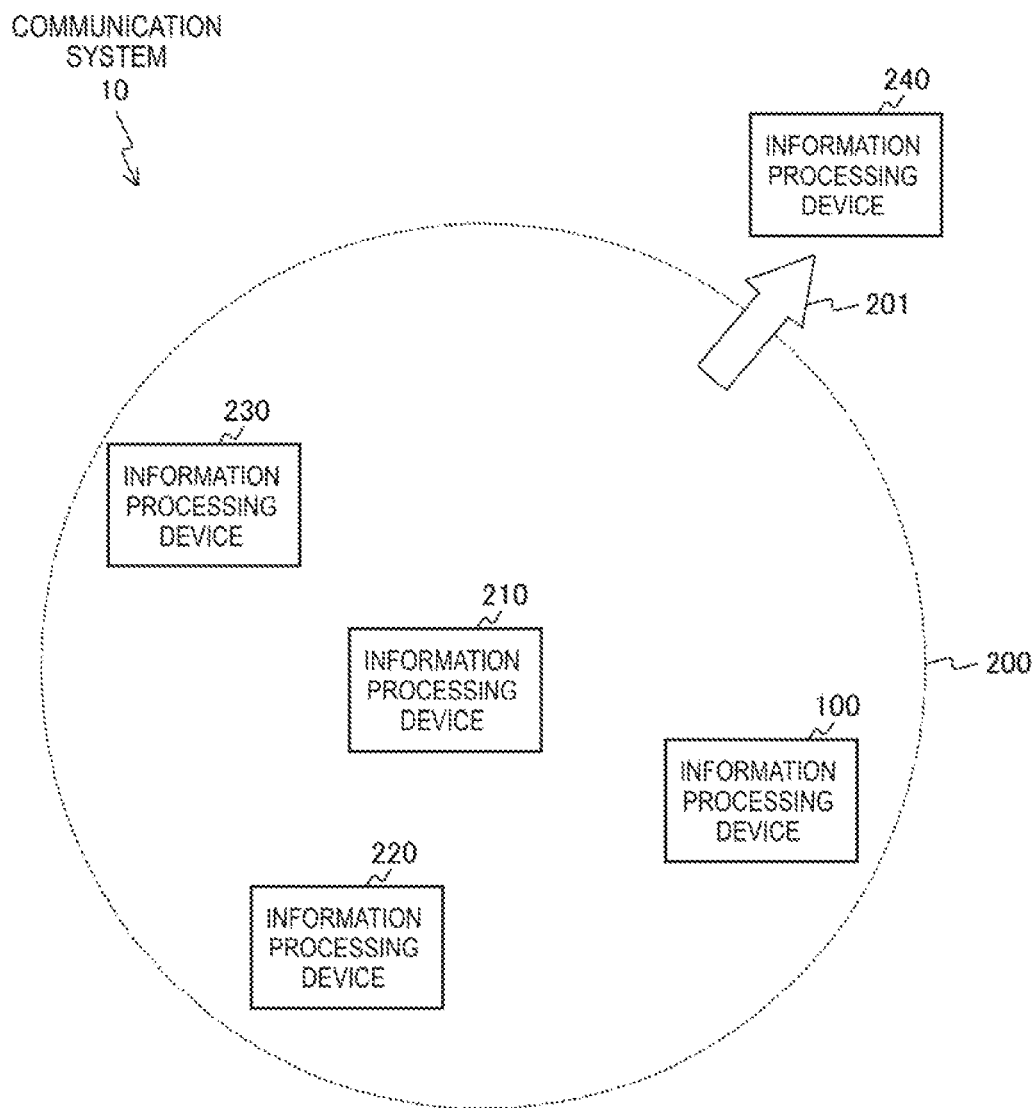
FIG. 4 is a diagram simplistically illustrating a case in which an information processing device 240 in the first embodiment of the present technology is disconnected from a network 200.

FIG. 4 is a diagram simplistically illustrating a case in which the information processing device 240 in the first embodiment of the present technology is disconnected from the network 200.

Here, in the embodiment of the present technology, an information processing device that can no longer receive radio waves (for example, beacons) from any other information processing device belonging to the same network will be referred to as a "disconnected information processing device."

For example, in a state illustrated in FIG. 1, the information processing device 240 can directly communicate with each of the information processing devices 100, 210, and 230, but is unable to directly communicate with the information processing device 220 due to radio waves not reaching. From this state, for example, as indicated by an arrow 201 of FIG. 4, it is assumed that the user who possesses the information processing device 240 has moved. After the movement, it is assumed that the information processing device 240 can no longer receive radio waves from any of the information processing devices 100, 210, and 230 with which direct communication was possible.

In this manner, when radio waves can no longer be received from any other information processing device belonging to the network 200, a detection unit (corresponds to the detection unit 150 illustrated in FIG. 2) of the information processing device 240 detects that the information processing device 240 is disconnected. For example, when the network in which IEEE 802.11S is used is built, if beacons from the other information processing devices can no longer be received for a predetermined time, the detection unit of the information processing device 240 detects that the information processing device 240 is disconnected.

In this manner, when disconnection of the information processing device 240 is detected, a control unit (corresponds to the control unit 170 illustrated in FIG. 2) of the information processing device 240 performs notification (for example, alert, alarm, or warning) indicating the fact that the information processing device 240 is disconnected from the network 200. The notification example is illustrated in FIG. 5.

[Notification Example of Disconnection]

FIG. 5 is a diagram illustrating a notification example when disconnection of the information processing device 240 in the first embodiment of the present technology is notified of FIG. 5a illustrates a notification example using a display. FIG. 5b illustrates a notification example using a display and a voice output. Note that, a display unit 241 corresponds to the display unit 180 illustrated in FIG. 2. Operation members 242 to 244 correspond to the operation accepting unit 160 illustrated in FIG. 2.

As illustrated in FIG. 5a, the control unit of the information processing device 240 can perform notification by displaying a display screen (an alert screen) indicating the fact that the information processing device 240 is disconnected from the network 200 on the display unit 241.

In addition, as illustrated in FIG. 5b, the control unit of the information processing device 240 can perform notification such that a display screen indicating the fact that the information processing device 240 is disconnected from the network 200 is displayed on the display unit 241 and a voice output 245 is performed. Note that, without displaying, notification may be performed only by a voice output. In addition, instead of performing the voice output 245 indicating the fact that the information processing device 240 is disconnected from the network 200, a specific voice (alert sound) may be output. In addition, notification may be performed by other notification methods such as notification by emitting light from a light emitting unit and notification by vibration of the information processing device 240.

In addition, for example, the control unit of the information processing device 240 may output information before the information processing device 240 is disconnected from the network 200, and provide information for recognizing a place before disconnection from the network 200 is performed to the user. For example, the information processing device 240 regularly or irregularly performs image generation by an image capturing unit (corresponding to the image capturing unit 120 illustrated in FIG. 2) and sound acquisition by a sound acquisition unit (corresponding to the sound acquisition unit 130 illustrated in FIG. 2), and sequentially records the results. Therefore, when it is detected that the information processing device 240 is disconnected from the network 200, the control unit of the information processing device 240 can sequentially output images or voices recorded before the detection timing.

In this manner, when disconnection of the information processing device 240 is detected, the control unit of the information processing device 240 performs control such that disconnection information (for example, a warning message and voice) indicating the fact that the information processing device 240 is disconnected is output.

[Detection Example of Information Processing Device Disconnected from Network]

The example in which the disconnected information processing device detects that it is disconnected has been described above. However, information processing devices belonging to the network 200 can detect disconnection of other information processing devices. Therefore, here, an example in which disconnection of another information processing device is detected will be described. Note that, in this example, an example in which, as the other information processing device, the information processing device 100 detects the disconnected information processing device 240 will be described. However, this can be similarly applied to a case in which an information processing device other than the information processing device 100 detects the disconnected information processing device 240.

For example, as indicated by the arrow 201 of FIG. 4, it is assumed that, when the user who possesses the information processing device 240 moves, the information processing device 240 can no longer receive radio waves from any of the information processing devices 100, 210, and 230 with which direct communication was possible. In this case, the information processing device 100 can detect that radio waves from the information processing device 240 with which direct communication was possible can no longer be received. For example, the control unit 170 of the information processing device 100 manages information processing devices (or information processing devices with which direct communication was previously possible) with which direct communication is possible in the terminal list 300 (illustrated in FIG. 3). Therefore, for example, when radio waves can no longer be received from the information processing device 240 with which direct communication was possible among information processing devices recorded in the terminal list 300, the detection unit 150 of the information processing device 100 can detect the fact.

In this manner, when it is detected that radio waves can no longer be received from the information processing device 240, the detection unit 150 of the information processing device 100 detects that the information processing device 240 is disconnected. In this case, the detection unit 150 of the information processing device 100 outputs a detection result indicating the fact that disconnection of the information processing device 240 is detected to the control unit 170. In addition, when disconnection of the information processing device 240 is detected, the control unit 170 of the information processing device 100 performs control such that disconnection information (for example, a warning message and voice) indicating the fact that the information processing device 240 is disconnected from the network 200 is output. For example, similarly to the notification example illustrated in FIG. 5, it is possible to output disconnection information using a display or a voice output. The notification example is illustrated in FIG. 6a.

[Notification Example of Disconnection]

FIG. 6 is a diagram illustrating a notification example of notification that an information processing device is disconnected or is likely to be disconnected in the first embodiment of the present technology. FIG. 6a illustrates a notification example when the information processing device 100 notifies of disconnection of the information processing device 240. In addition, FIG. 6b illustrates a notification example when the information processing device 100 notifies of the subject device that is likely to be disconnected. Note that, operation members 161 to 163 correspond to the operation accepting unit 160 illustrated in FIG. 2.

As illustrated in FIG. 6a, the control unit 170 of the information processing device 100 can perform notification by displaying a display screen (an alert screen) indicating the fact that the information processing device 240 is disconnected from the network 200 on the display unit 180. Also, FIG. 6a illustrates an example in which the identification information 1004 for identifying the disconnected information processing device 240 is displayed. However, other information (for example, information for identifying the user of the disconnected information processing device) capable of identifying the disconnected information processing device 240 may be displayed. For example, user identification information (for example, a nickname of the user and an image of the user) capable of identifying the disconnected information processing device 240 is recorded in association with the terminal list 300. Therefore, the user identification information when disconnection is notified of may be output (a display and a voice output) as disconnection information.

In addition, for example, the control unit 170 of the information processing device 100 may output information before the information processing device 240 is disconnected from the network 200, and provide information for recognizing a place before the information processing device 240 is disconnected from the network 200 to the user. For example, as described above, the information processing device 240 regularly or irregularly performs image generation by an image capturing unit and sound acquisition by a sound acquisition unit, and sequentially transmits the results to another information processing device (for example, the information processing device 100). Therefore, when it is detected that the information processing device 240 is disconnected from the network 200, the control unit 170 of the information processing device 100 can sequentially output images or voices 2received before the detection timing.

Here, it is assumed that, even when the information processing device 100 can no longer receive radio waves from the information processing device 240, the other information processing devices belonging to the network 200 can receive radio waves from the information processing device 240. Therefore, even when it is detected that radio waves from the information processing device 240 can no longer be received, the control unit 170 of the information processing device 100 makes an inquiry to the other information processing devices belonging to the network 200 before disconnection information indicating that fact is output.

For example, the control unit 170 transmits information (inquiry information) for making an inquiry about whether an information processing device capable of receiving radio waves from the information processing device 240 is in the network 200 to the other information processing devices belonging to the network 200. In this case, the inquiry information is transmitted through the multi-hop•relay to an information processing device (an information processing device belonging to the network 200) that is unable to directly communicate with the information processing device 100. As the inquiry result, when the information processing device capable of receiving radio waves from the information processing device 240 is in the network 200, no disconnection information is output. On the other hand, when the information processing device capable of receiving radio waves from the information processing device 240 is not in the network 200, as described above, disconnection information is output. In this case, the disconnection information may be transmitted to the other information processing devices belonging to the network 200 and the disconnection information may be output from the other information processing devices.

[Detection Example of Information Processing Device that is Likely to be Disconnected]

The example in which the disconnected information processing device is detected and disconnection information indicating that fact is output has been described above. Here, it is assumed that there is an information processing device that is not disconnected but is likely to be disconnected. In this manner, when there is an information processing device that is likely to be disconnected, the information processing device is quickly detected, and by notifying of that fact while the information processing device is in the network, disconnection can be prevented. Therefore, an example of notification that an information processing device that is likely to be disconnected is detected will be described below.

For example, it is assumed that an information processing device in a central portion (a physically central portion) of the network or in the vicinity thereof can receive radio waves from a plurality of information processing devices belonging to the same network.

Therefore, for example, a change in the number of other information processing devices (the number of information processing devices belonging to the same network) from which an information processing device can receive radio waves can be used as an index of a possibility of disconnection. For example, when the number of other information processing devices (the number of information processing devices belonging to the network 200) from which the information processing device 100 can receive radio waves is reduced, the detection unit 150 of the information processing device 100 can determine that the information processing device 100 is likely to be disconnected. Note that, a decrease of the number of information processing devices belonging to the same network can be determined based on content of the terminal list 300 illustrated in FIG. 3. Therefore, the control unit 170 of the information processing device 100 can output disconnection information indicating the fact that the information processing device 100 that is likely to be disconnected from the network 200 is detected. The notification example is illustrated in FIG. 6b.

In addition, for example, the control unit 170 of the information processing device 100 transmits disconnection information indicating that fact to a nearby information processing device and the disconnection information may be output from the nearby information processing device. Accordingly, it is possible to notify a nearby user of the presence of the information processing device 100 that is likely to be disconnected.

In addition, a change of a radio wave strength (a signal strength) can be used. For example, it is assumed that, when movement is performed in a direction away from the network, even if radio waves can be received from the plurality of information processing devices, a strength of radio waves received from any device gradually decreases. Therefore, in this manner, while radio waves can be received from the plurality of information processing devices, when a strength of radio waves received from any device decreases, a possibility of disconnection from the network can be determined. In this case, the detection unit 150 of the information processing device 100 can detect a possibility of disconnection from the network 200.

However, a case in which movement is performed in the network instead of movement in a direction away from the network is also assumed. In this case, it is assumed a case in which a radio wave strength from a certain information processing device decreases but a radio wave strength from the other information processing devices increases. Therefore, in this manner, when a radio wave strength from a certain information processing device decreases, but a radio wave strength from the other information processing devices increases, it is possible to determine that the information processing devices is unlikely to be disconnected from the network. In this case, the detection unit 150 of the information processing device 100 does not detect a possibility of disconnection from the network 200.

Accordingly, it is possible to prevent an unnecessary alert and increase reliability of alerts to the user.

[Other Notification Examples]

The example in which, when the information processing device is disconnected from the network or is likely to be disconnected, the user is notified of the fact using a display or a voice output of disconnection information indicating that fact has been described above. Here, it is assumed that, when the information processing device is disconnected from the network, the user has difficulty determining where to go to return to the network. Similarly, it is assumed that, when the information processing device is likely to be disconnected from the network, the user has difficulty determining where to go to maintain the network.

Therefore, here, an example in which, when the information processing device is disconnected from the network or is likely to be disconnected, that fact is notified of and a place or a direction to or in which to move is also notified of will be described.

FIG. 7 is a diagram illustrating an exemplary display screen displayed on the display unit 180 in the first embodiment of the present technology. FIG. 7a illustrates one example of a display screen indicating a direction (or an orientation) in which to move to return to the network after disconnection or a possibility of disconnection is detected.

FIG. 7a illustrates an example in which an arrow 311 indicating a direction (or an orientation) in which to move to return to the network is displayed. Note that, for example, the arrow 311 can be displayed while the user holds the information processing device 100 such that a surface of the display unit 180 of the information processing device 100 is an upper side in a vertical direction. Also, display of the arrow 311 is effective, for example, when an amount of information that can be displayed is limited (for example, when a display surface has a small area).

For example, the control unit 170 of the information processing device 100 retains change information from the posture detection unit 110 for a predetermined period. Therefore, when disconnection of the information processing device 100 from the network 200 is detected, the control unit 170 of the information processing device 100 estimates a direction returning to the network 200 based on retained change information (history information) for a predetermined period. Also, when radio waves are likely to be interrupted or radio waves become weak, the control unit 170 of the information processing device 100 may start the estimation process.

For example, when sensor information using an acceleration sensor is used as change information, a moving direction immediately before disconnection is detected is specified, and a direction (a direction returning to the origin) opposite to the moving direction can be estimated as a direction returning to the network.

In addition, for example, when sensor information using a geomagnetic sensor (an orientation sensor) is used as change information, an orientation of a moving direction immediately before disconnection is detected is specified, and an orientation opposite to the orientation of the moving direction can be estimated as an orientation returning to the network.

In addition, a direction returning to the network may be estimated using a wireless radio wave strength. For example, when it is detected that movement is performed in a direction in which a radio wave strength increases, the direction (the direction in which a radio wave strength increases) can be estimated as a direction returning to the network. On the other hand, when movement in a direction in which a radio wave strength decreases is detected, a direction opposite thereto can be estimated as a direction returning to the network.

In addition, for example, a distance to a nearby information processing device is computed based on the radio wave strength, and the distance and an alert may be displayed at the same time. For example, the distance may be displayed using a numerical value or may be displayed using a length of an arrow or a color of an arrow.

For example, a table showing a relation between a radio wave strength and a distance is created in advance and stored in the storage unit 171. Therefore, the control unit 170 of the information processing device 100 acquires a distance corresponding to a radio wave strength acquired by the wireless communication unit 140 from the table, and can use the distance as a distance to the nearby information processing device.

In addition, the direction returning to the network or the distance to the nearby information processing device may be estimated using sensor information of the acceleration sensor and the geomagnetic sensor and the radio wave strength. For example, a direction or a distance is estimated based on any information, and it is possible to correct the estimated direction or distance based on the other information. Accordingly, it is possible to increase estimation accuracy of the direction or the distance.

In addition, based on a change in the radio wave strength after the user moves in an arrow direction, a display mode of the arrow may be appropriately changed. For example, after movement is performed in the arrow direction, when the radio wave strength decreases, an arrow at a side opposite to a currently displayed arrow is displayed, and a small arrow can be displayed. Accordingly, it is possible to perform display visually clearly.

In addition, the user may be notified of these pieces of information by a voice output.

FIG. 7b illustrates one example of a display screen indicating a relative position (a position of a subject device) with other devices after disconnection is detected. FIG. 7b illustrates an example in which information processing devices are represented by rectangles 321 to 325. Note that, the display method is effective, for example, when an amount of information that can be displayed is large (for example, when a display surface has a large area).

For example, a relative position (a position of the subject device) with other devices can be detected using radio waves. For example, the control unit 170 of the information processing device 100 acquires radio wave strengths from the plurality of information processing devices. Based on such radio wave strengths, the relative position (the position of the subject device) with the other information processing devices can be obtained using a triangulation measurement method. Note that, when this position estimating method is used, it may be impossible to obtain an absolute position of the information processing device 100. However, when the relative positions with the other information processing devices obtained by the plurality of information processing devices belonging to the network are counted and used, it is possible to exactly map the relative position with each of the information processing devices to some extent.

For example, information processing devices belonging to the network obtain the relative position (the position of the subject device) with the other information processing devices and share information about the position (position information) via the network. Therefore, the relative position of the subject device can be obtained based on a position (a relative position of the subject device seen from other information processing devices) obtained by other information processing devices and a position (a relative position (a position of the subject device) with other information processing devices) obtained by the subject device.

In addition, it is possible to display information about an information processing device that the subject device is moving away from and an information processing device that the subject device is approaching. Accordingly, it is possible to help with guidance when the user moves.

In addition, it is assumed a case in which a plurality of antennas are provided in the information processing device 100, and radio waves are transmitted and received using the plurality of antennas. In this case, the control unit 170 of the information processing device 100 can predict a direction in which radio waves are received by acquiring a difference of radio waves that reach the antennas of the information processing device 100. In addition, the control unit 170 of the information processing device 100 can transmit radio waves having directivity to some extent.

In addition, when the direction predicted by information processing devices belonging to the network is shared via the network, it is possible to further increase accuracy of the direction predicted by the information processing devices. In addition, when radio waves having directivity are transmitted and received in cooperation with each other via the network, it is possible to further increase the accuracy of the prediction.

In addition, when position estimation based on the radio wave strength, and prediction of a direction in which radio waves reach are combined, it is possible to more accurately predict the relative position. In addition, along with such a combination, when the sensor information of the acceleration sensor and the geomagnetic sensor described above is used together, it is possible to further increase a system of relative position prediction.

In this manner, when a virtual information processing device map created based on relative position information is displayed, it is possible to easily visually recognize a position of the subject device or a position of the disconnected information processing device (the information processing device that is likely to be disconnected).

In addition, for example, the control unit 170 of the information processing device 100 acquires position information about a position of the information processing device 100 through GPS, and can display a map including the position of the information processing device 100 on the display unit 180 based on the position information. Therefore, the control unit 170 of the information processing device 100 may arrange the rectangles 321 to 325 indicating the information processing device 100 and other information processing devices on the map. Note that, map data for displaying a map may be stored in the storage unit 171, or acquired from the outside for each display. In addition, the map data is, for example, data specified by a latitude and a longitude, and divided into a plurality of areas in units of a predetermined latitude width and longitude width. Also, a position of the information processing device 100 on the map is specified by position information acquired through GPS. In addition, positions of other information processing devices on the map can be specified by a distance and a direction when the position of the information processing device 100 is used as a reference. In addition, the control unit 170 of the information processing device 100 may regularly or irregularly acquire position information for specifying positions of other information processing devices, and retain the result in the terminal list 300. Accordingly, the control unit 170 of the information processing device 100 can arrange rectangles indicating information processing devices on the map using position information of information processing devices retained in the terminal list 300. That is, the control unit 170 can arrange and display labels (the rectangles 321 to 325) indicating information processing devices on the map including the position of the information processing device 100 based on position information about the position of the information processing device 100. In addition, similarly to FIG. 7a, an arrow 326 indicating a direction in which to move to return to the network may be displayed on the map.

Note that, while FIG. 7b illustrates the example in which rectangles are displayed as images representing information processing devices, other images may be displayed. For example, information (additional information) about the user who possesses the information processing device (a moving body) or information (additional information) about a place in which the information processing device (a fixed type device) is installed is stored in association with the information processing device, and such additional information may be displayed. For example, as the information about the user who possesses the information processing device (a moving body), a name, a nickname and an image of the user can be associated and retained in the terminal list 300. In addition, as the information about a place in which the information processing device (a fixed type device) is installed, a street address, a location name, a landmark, and a tourist spot name of the place and images thereof can be associated and retained in the terminal list 300. Therefore, the associated additional information is displayed in positions (positions on a display surface) in which information processing devices are displayed, and thus a relation with a current object or a current place can be easily recognized. Accordingly, it is possible for the user to easily recognize a direction in which to move and provide valid alert information.

In this manner, when disconnection of the information processing device 100 is detected, the control unit 170 of the information processing device 100 performs control such that information for the information processing device 100 to return to the network 200 is output. In this case, the control unit 170 can display labels (for example, the arrows 311 and 326) indicating an advancing direction for the information processing device 100 to return to the network 200. In addition, the control unit 170 can display labels (for example, the rectangles 321 to 325) indicating a relative positional relation between the information processing device 100 and the other information processing devices belonging to the network 200. That is, the control unit 170 acquires information about the relative position with the other information processing devices belonging to the network 200, and can display the relative positional relation of information processing devices based on the information. In addition, the control unit 170 may display at least one thereof.

[Operation Example of Information Processing Device]

Figure 8:
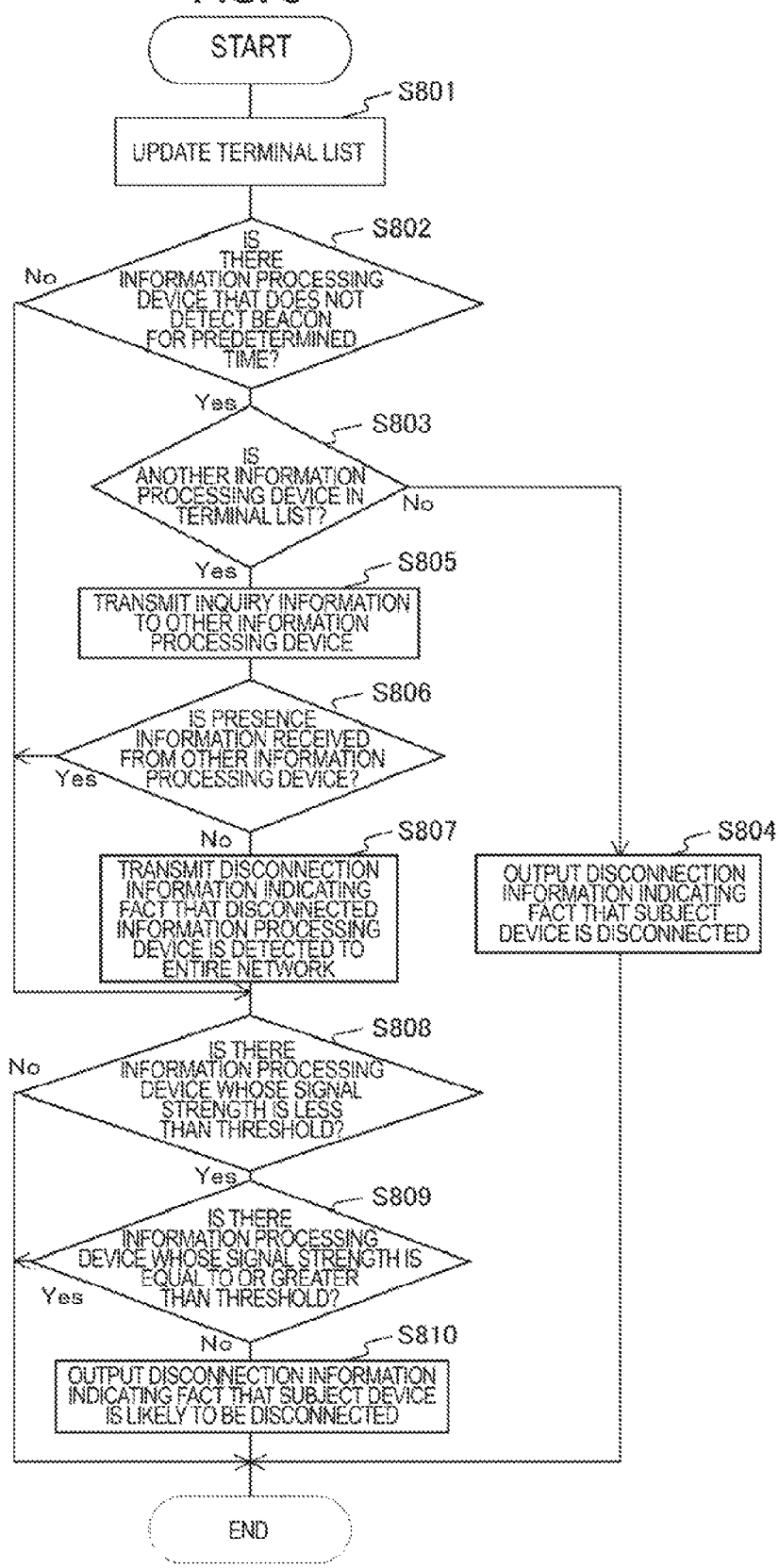
FIG. 8 is a flowchart illustrating exemplary processing procedures of a disconnection information output process performed by the information processing device 100 in the first embodiment of the present technology.

FIG. 8 is a flowchart illustrating exemplary processing procedures of a disconnection information output process performed by the information processing device 100 in the first embodiment of the present technology.

First, the control unit 170 updates the terminal list 300 (Step S801). Next, the detection unit 150 determines whether there is an information processing device that does not detect a beacon for a predetermined time among information processing devices stored in the terminal list 300 (Step S802). When there is no information processing device that does not detect a beacon for a predetermined time among information processing devices stored in the terminal list 300, the process advances to Step S808.

When there is an information processing device that does not detect a beacon for a predetermined time among information processing devices stored in the terminal list 300 (Step S802), the detection unit 150 determines whether there is another information processing device in the terminal list 300 (Step S803). When the other information processing device is not in the terminal list 300 (Step S803), the detection unit 150 determines that the subject device (the information processing device 100) is disconnected, and outputs a detection result indicating that fact to the control unit 170. Therefore, the control unit 170 outputs disconnection information indicating the fact that the subject device is disconnected (Step S804). For example, as illustrated in FIGS. 5a and 5b, disconnection information is output.

When the other information processing device is in the terminal list 300 (Step S803), the detection unit 150 outputs a detection result indicating that fact to the control unit 170.

In this case, the control unit 170 transmits inquiry information to the other information processing device stored in the terminal list 300 (Step S805). The inquiry information is information for inquiring whether the information processing device (the information processing device that does not detect a beacon for a predetermined time) detected by the information processing device 100 does not detect a beacon for a predetermined time in the other information processing device.

Next, the control unit 170 determines whether presence information is received from at least one of the other information processing devices to which inquiry information is transmitted (Step S806). The presence information is, for example, information indicating the fact that the information processing device (the information processing device (the information processing device that does not detect a beacon for a predetermined time) detected by the information processing device 100) corresponding to the inquiry information detects a beacon in the other information processing device. In other words, the presence information is information indicating the fact that the information processing device corresponding to the inquiry information is not disconnected from the network.

When the presence information is received from at least one of other information processing devices to which the inquiry information is transmitted (Step S806), since it means that the information processing device corresponding to the inquiry information belongs to the network, the process advances to Step S808.

When the presence information is not received from any other information processing device to which the inquiry information is transmitted (Step S806), the control unit 170 transmits disconnection information indicating the fact that the disconnected information processing device is detected to information processing devices belonging to the network (Step S807). In this case, the disconnection information is transmitted to an information processing device that is unable to directly communicate with the information processing device 100 among the information processing devices belonging to the network through the multi-hop•relay. In this manner, when the disconnection information is transmitted, it is possible to output disconnection information from information processing devices belonging to the same network. Accordingly, it is possible to quickly notify the user of each information processing device belonging to the same network of the fact that the information processing device is disconnected.

Next, the detection unit 150 determines whether there is an information processing device whose radio wave strength is less than a threshold among information processing devices stored in the terminal list 300 (Step S808). When there is an information processing device whose radio wave strength is less than the threshold (Step S808), the detection unit 150 determines whether there is another information processing device whose radio wave strength is equal to or greater than the threshold among information processing devices stored in the terminal list 300 (Step S809).

Here, when there is an information processing device whose radio wave strength is less than the threshold but there is another information processing device whose radio wave strength is equal to or greater than the threshold among information processing devices stored in the terminal list 300, it can be determined that the information processing device 100 is unlikely to be disconnected. Therefore, when there is another information processing device whose radio wave strength is equal to or greater than the threshold among information processing devices stored in the terminal list 300 (Step S809), an operation of the disconnection information output process ends.

When the other information processing device whose radio wave strength is equal to or greater than the threshold is not among information processing devices stored in the terminal list 300 (Step S809), the detection unit 150 can determine that the information processing device 100 is likely to be disconnected. Accordingly, the detection unit 150 outputs a detection result indicating that fact to the control unit 170. Therefore, the control unit 170 outputs disconnection information indicating the fact that the subject device is likely to be disconnected (Step S810). For example, as illustrated in FIG. 6b, the disconnection information is output. Note that, Steps S802, S803, S805, S806, S808, and S809 are exemplary detection procedures described in the claims. In addition, Steps S804, S807, and S810 are exemplary controlling procedures described in the claims.

<2. Second Embodiment>

The first embodiment of the present technology exemplified a case in which information processing devices belonging to the same network detect disconnection (or a possibility of disconnection) of the subject device or another device and output disconnection information indicating that fact. Here, in an environment in which a plurality of networks are built, it is conceivable that the presence of the information processing device disconnected from the same network is inquired of information processing devices belonging to another network, and the presence of the disconnected information processing device is confirmed.

Therefore, the second embodiment of the present technology exemplifies a case in which the presence of the information processing device disconnected from the same network is inquired of information processing devices belonging to the other network, and the presence of the disconnected information processing device is confirmed.

[Configuration Example of Communication System]

Figure 9:
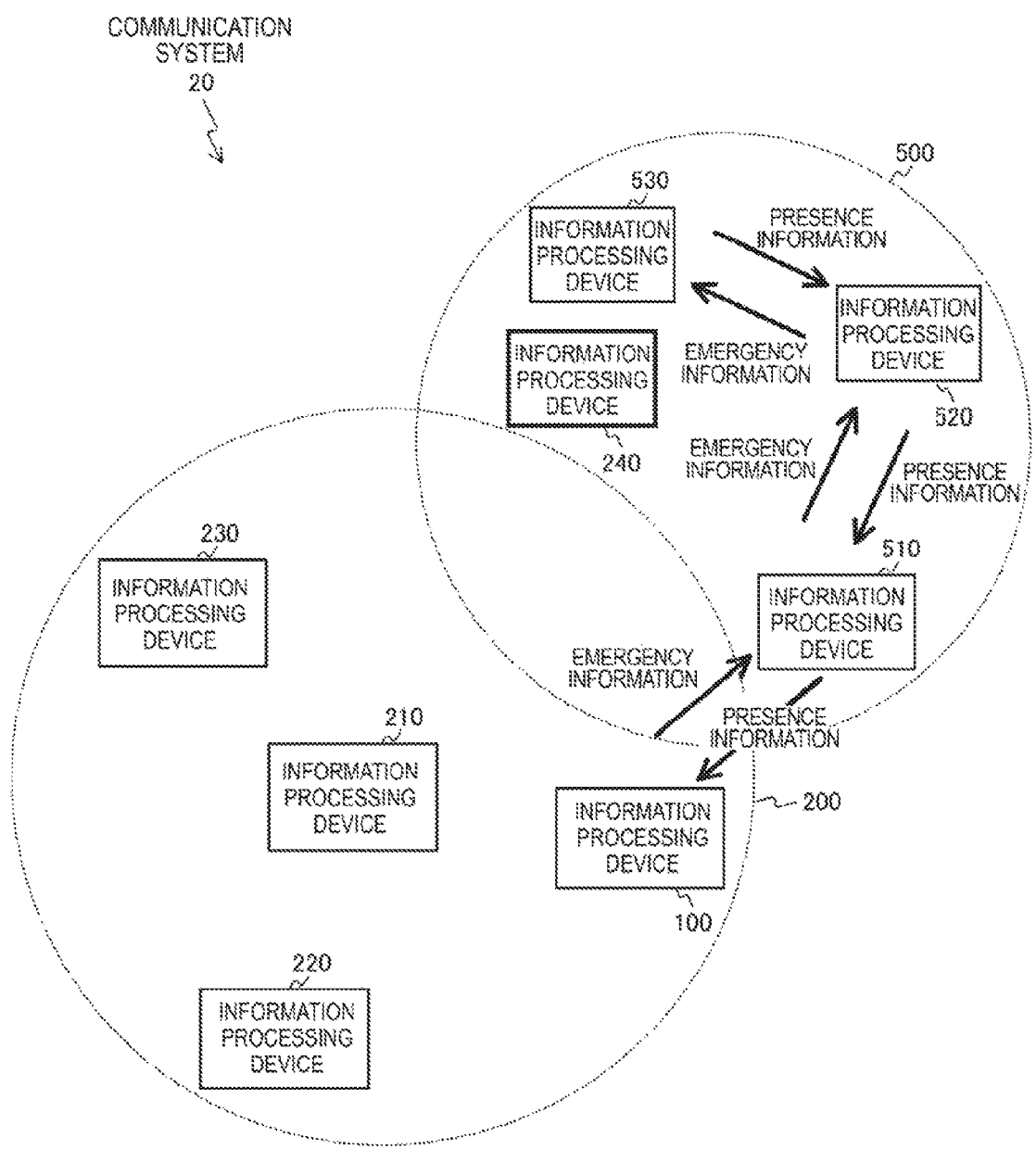
FIG. 9 is a diagram illustrating a system configuration example of a communication system 20 in a second embodiment of the present technology.

FIG. 9 is a diagram illustrating a system configuration example of a communication system 20 in the second embodiment of the present technology.

The communication system 20 includes a plurality of information processing devices (information processing devices 100, 210, 220, 230, and 240, 510, 520, and 530). Note that, the information processing devices of the communication system 20 are the same as the information processing devices illustrated in the first embodiment of the present technology, and refer to, for example, a portable information processing device or a fixed-type information processing device having a wireless communication function.

In addition, it is assumed that the information processing devices 100, 210, 220, 230, and 240 belong to the same network 200, and the information processing devices 510, 520, and 530 belong to the same network 500. However, as illustrated in FIG. 9, it is assumed that, since the user who possesses the information processing device 240 moves, the information processing device 240 is disconnected from the network 200.

Here, in general, the information processing devices 100, 210, 220, and 230 are unable to communicate (directly communicate or communicate through a relay station) with the information processing devices 510, 520, and 530 belonging to the other network 500. Therefore, in general, the information processing devices 100, 210, 220, and 230 are unable to detect the disconnected information processing device 240.

Therefore, in the second embodiment of the present technology, the information processing device 240 disconnected from the network 200 is found through cooperation with the information processing devices 510, 520, and 530 that belong to the other network 500 and with which communication may be generally impossible.

For example, as illustrated in FIG. 9, when there is the network 500 adjacent to the network 200, an emergency information item is transmitted from the information processing device 100 belonging to the network 200 to inquire of the information processing device 240 disconnected from the network 200. The emergency information item will be described in detail with reference to FIGS. 10 and 11.

[Format Example of Emergency Information Item]

Figure 10:
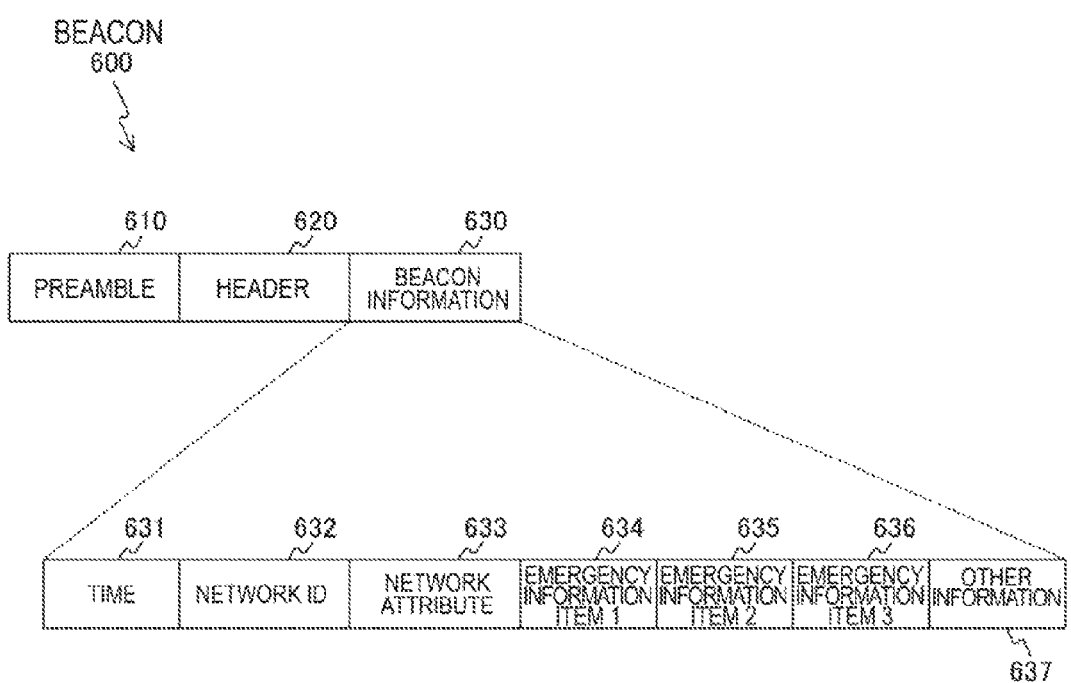
FIG. 10 is a diagram illustrating a format example of a beacon (a beacon frame) that is transmitted from information processing devices of the communication system 20 in the second embodiment of the present technology.

FIG. 10 is a diagram illustrating a format example of a beacon (a beacon frame) that is transmitted from information processing devices of the communication system 20 in the second embodiment of the present technology.

A beacon 600 includes a preamble 610, a header 620, and beacon information 630.

The preamble 610 is information indicating the presence of a packet (a beacon). That is, information processing devices of the communication system 20 can detect the presence of the beacon by receiving the preamble 610.

The header 620 stores information about the packet (beacon) itself arranged in a predetermined position of the packet. For example, information items (information about the packet (beacon) itself) such as a transmission source, a transmission destination, and a size of a packet are stored in the header 620. That is, information processing devices of the communication system 20 decode and analyze the header. According to the analysis, information processing devices of the communication system 20 can detect which information processing devices transmit and receive a signal and a type of the signal (for example, whether it is a beacon).

The beacon information 630 is information that information processing devices of the communication system 20 are informed of. That is, information processing devices of the communication system 20 include information of which other information processing devices are to be informed in a beacon and transmit the beacon.

Next, the beacon information 630 will be described in detail.

The beacon information 630 includes time information 631, a network ID 632, a network attribute 633, emergency information items 1 to 3 (634 to 636), and other information 637.

The time information 631 is time information indicating a time at which the beacon including the information is transmitted from an information processing device serving as a transmission source.

The network ID 632 is information indicating an ID of a network to which the information processing device serving as a transmission source belongs.

The network attribute 633 is information indicating an attribute of a network to which the information processing device serving as a transmission source belongs.

The emergency information items 1 to 3 (634 to 636) are information for an emergency that can also be transferred to an information processing device in a network to which the information processing device serving as a transmission source does not belong. For example, in fields of the emergency information items 1 to 3 (634 to 636), identification information (for example, the identification information 301 illustrated in FIG. 3) for identifying an information processing device that is disconnected from a certain network and searched for is stored.

Here, in the mesh network in which IEEE 802.11S is used, it is possible to recognize information processing devices inside or outside of the mesh network by a beacon frame that is periodically transmitted. For example, while in a certain network, an information processing device in the network can detect another information processing device that is likely to be disconnected. However, another information processing device (another information processing device that is not in a range that radio waves reach) that has been disconnected once from the network is unable to detect an information processing device in the network.

Therefore, in the second embodiment of the present technology, fields (the emergency information items 1 to 3 (634 to 636)) for storing data for an emergency are provided in the beacon (the beacon frame) 600. Therefore, an information processing device that has received the emergency information item stored in the field transfers the emergency information item regardless of whether the emergency information item is transmitted from the network to which the subject device belongs.

For example, when the information processing device that has received the emergency information item detects an information processing device corresponding to the identification information included in the emergency information item, presence information responding to the emergency information item is transmitted to the information processing device serving as a transmission source of the emergency information item. In this case, the presence information responding to the emergency information item is transmitted to the information processing device serving as a transmission source of the emergency information item through the multi-hop•relay. In addition, response information for the emergency information item includes, for example, the fact that an information processing device corresponding to identification information included in the emergency information item is detected.

In addition, for example, it is also assumed that the information processing device that has received the emergency information item is an information processing device (that is, the subject device is a search target device) corresponding to identification information included in the emergency information item. In this case, the information processing device that has received the emergency information item transmits the presence information responding to the emergency information item to the information processing device serving as a transmission source of the emergency information item. Similarly to this case, the presence information responding to the emergency information item is transmitted to the information processing device serving as a transmission source of the emergency information item through the multi-hop•relay. In addition, the presence information responding to the emergency information item includes, for example, the fact that the information processing device corresponding to identification information included in the emergency information item is the subject device.

In this manner, it is possible to discover the information processing device disconnected from the network.

Note that, a priority is assigned to fields of the emergency information items 1 to 3 (634 to 636), and a level of receiving/transferring the emergency information item may be controlled according to the priority. For example, a priority of the emergency information item stored in the field of the emergency information item 1 (634) can be set to be the highest (a first priority), and a priority of the emergency information item stored in the field of the emergency information item 3 (636) can be set to be the lowest (a third priority). In addition, a priority of the emergency information item stored in the field of the emergency information item 2 (635) can be set to be an intermediate thereof (a second priority).

For example, information used for public purpose emergency communication is stored in the field of the emergency information item 1 (634), and information used for private purpose emergency communication is stored in the field of the emergency information item 3 (636).

In addition, for example, when an emergency information item received from another network is transferred, the emergency information item is transferred using the beacon and the emergency information item may be broadcast into an affiliated network.

Note that, while FIG. 10 illustrates an example in which three emergency information items 1 to 3 (634 to 636) are stored as emergency information items, 1, 2, 4 or more emergency information items may be stored.

In addition, the other information 637 is information other than the above-described information.

[Transmission Example of Emergency Information Item]

FIG. 11 is a diagram illustrating a transmission example when information processing devices of the communication system 20 in the second embodiment of the present technology transmit an emergency information item.

FIG. 11 illustrates an example in which a beacon (a beacon signal) including an emergency information item is periodically transmitted. In addition, FIG. 11 illustrates an example in which a beacon is transmitted when a horizontal axis is set as a time axis. Note that, FIG. 11a schematically illustrates beacons 641 to 645 that are sequentially transmitted in time series. In addition, FIG. 11b schematically illustrates beacons 661 to 665 that are sequentially transmitted in time series.

Here, in the mesh network in which IEEE 802.11S is used, it is assumed that a beacon is used to detect disconnection or detect an information processing device that is likely to be disconnected. Here, the beacon is periodically transmitted at predetermined intervals. However, when information included in the beacon increases, there is concern about performance of the network decreasing.

Therefore, a transmission interval of the beacon may be changed. For example, in a place in which a radio wave strength from other information processing devices is high, a transmission interval of the beacon is set to be long. On the other hand, in a place in which disconnection from the network is likely or in a place in which the device is located immediately after being disconnected from the network, a transmission interval of a beacon is set to be short and transmission is performed frequently. In this case, transmission power and reception power may be set to be high.

In addition, as described above, when the emergency information item is included in the beacon that is transmitted, there is concern about performance of the network decreasing by the inclusion of the emergency information item in all beacons. Therefore, for example, the emergency information item can be intermittently included. For example, as illustrated in FIG. 11a, emergency information items 651 and 652 are included only in the beacons 641 and 644 for each predetermined interval.

In addition, a frequency to be included in the frame may be changed according to the priority. For example, as illustrated in FIG. 11b, emergency information items 671, 673, 674, and 676 having a high priority are included only in the beacons 661, 662, 664, and 665 for each predetermined interval. In addition, for example, as illustrated in FIG. 11b, emergency information items 672 and 675 having the next highest priority are included only in the beacons 662 and 665 for each predetermined interval.

In this manner, information processing devices of the communication system 20 periodically inform a nearby information processing device of the emergency information item (included in the beacon).

For example, when the information processing device 100 illustrated in FIG. 9 broadcasts a beacon, a nearby information processing device (for example, the information processing device 510) receives the beacon. Therefore, the information processing device 510 can detect that the beacon is a beacon transmitted from the information processing device 100 based on a header of the received beacon. In addition, when the information processing device 510 confirms content of the beacon information 630 included in the received beacon, it is possible to recognize the inclusion of the emergency information item in the received beacon.

In this manner, when the emergency information item is received from the information processing device 100, the information processing device 510 determines whether the information processing device 240 corresponding to identification information included in the emergency information item is in a range that radio waves reach. In the example illustrated in FIG. 9, the information processing device 240 corresponding to identification information included in the emergency information item is not in a range that radio waves of the information processing device 510 reach. Therefore, in the information processing device 510, the device itself is operated as a relay station of the multi-hop•relay, and the emergency information item is transferred to the information processing device 520. Similarly, the emergency information item is transferred to the information processing device 530.

Here, the information processing device 240 is in a range that radio waves of the information processing device 530 reach. In this case, when the information processing device 530 receives the emergency information item, the information processing device 530 determines that the information processing device 240 corresponding to identification information included in the emergency information item is in the range that radio waves reach. Therefore, the information processing device 530 transmits presence information indicating the fact that the information processing device 240 corresponding to identification information included in the emergency information item is present to the information processing device 100 that has initially transmitted the emergency information item.

When the emergency information item is repeatedly transmitted and received in this manner, the emergency information item transmitted from the information processing device 100 can be transferred throughout the network. That is, by including the emergency information item in the beacon that is periodically transmitted, each information processing device can inform the nearby information processing device of the emergency information item.

[Operation Example of Information Processing Device (Transmission Source of Emergency Information Item)]

Figure 12:
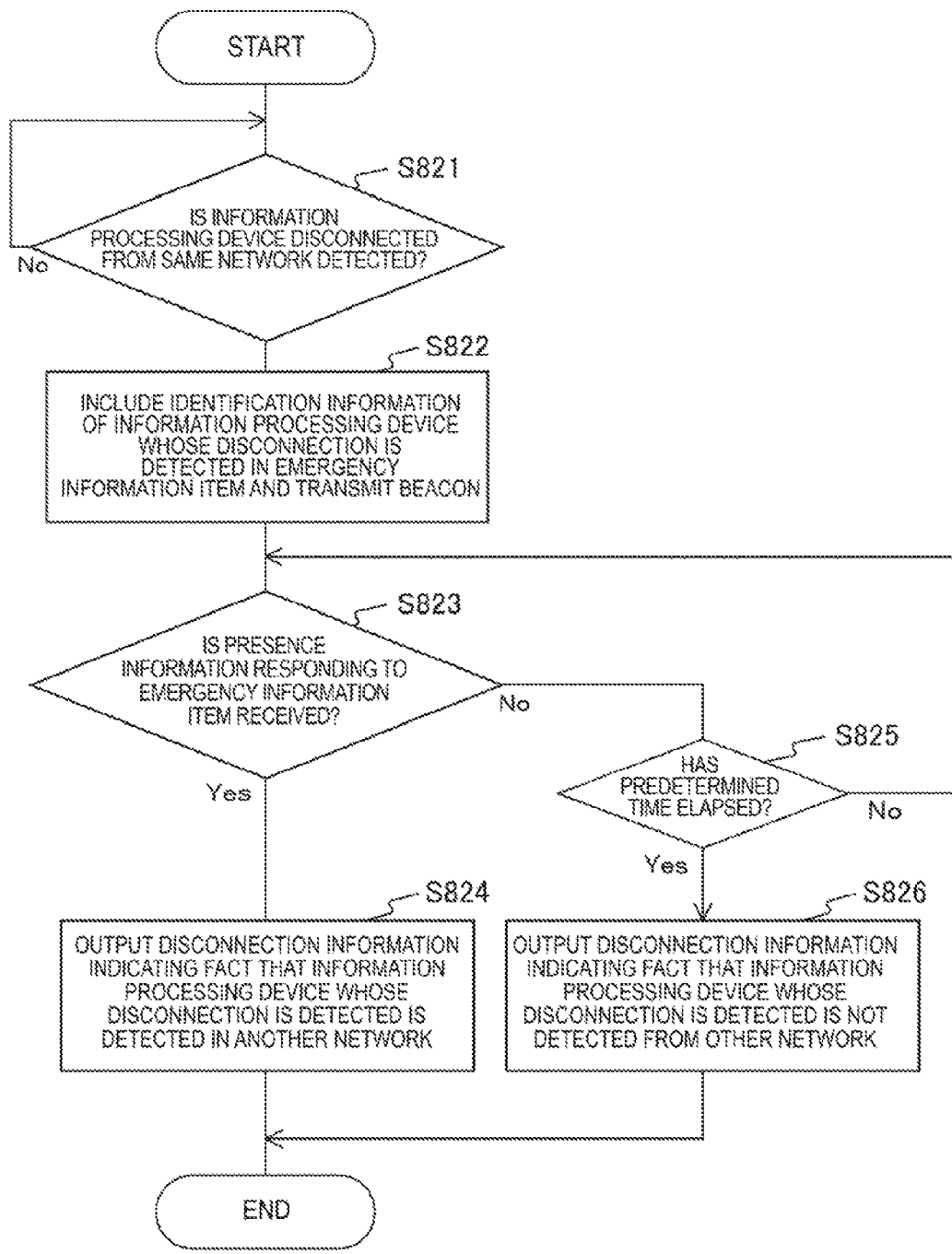
FIG. 12 is a flowchart illustrating exemplary processing procedures of a disconnection information output process performed by the information processing device 100 in the second embodiment of the present technology.

FIG. 12 is a flowchart illustrating exemplary processing procedures of a disconnection information output process performed by the information processing device 100 in the second embodiment of the present technology. FIG. 12 illustrates an example in which, when the information processing device 100 detects an information processing device disconnected from the network 200, an emergency information item for detecting the information processing device is transmitted.

First, the control unit 170 determines whether an information processing device disconnected from the same network is detected (Step S821). For example, it is assumed a case in which the information processing device 100 detects an information processing device disconnected from the same network. In addition, for example, it is assumed a case in which, the disconnected information processing device is detected by another information processing device belonging to the same network, and the information processing device 100 detects the information processing device disconnected from the same network by receiving the inquiry information. Therefore, when the information processing device disconnected from the same network is not detected (Step S821), monitoring is continuously performed.

For example, as illustrated in FIG. 9, when the information processing device 240 is disconnected from the network 200, disconnection of the information processing device 240 is detected (Step S821).

When the information processing device disconnected from the same network is detected (Step S821), the control unit 170 includes identification information of the information processing device whose disconnection is detected in the emergency information item and transmits the beacon (Step S822).

Next, the control unit 170 determines whether presence information responding to the emergency information item is received (Step S823). When the presence information responding to the emergency information item is received (Step S823), the control unit 170 outputs disconnection information indicating the fact that the information processing device whose disconnection is detected is detected in another network (Step S824). For example, similarly to the first embodiment of the present technology, the disconnection information is output by a message display or a voice output. In addition, disconnection information may be output from other information processing devices.

In addition, when the presence information responding to the emergency information item is not received (Step S823), the control unit 170 determines whether a predetermined time has elapsed (Step S825). When the predetermined time has not elapsed, the process returns to Step 5823. On the other hand, when the predetermined time has elapsed (Step S825), the control unit 170 outputs disconnection information indicating the fact that the information processing device whose disconnection is detected is not detected from the other network (Step S826). For example, similarly to the first embodiment of the present technology, the disconnection information is output by a message display or a voice output. In addition, the disconnection information may be output from other information processing devices.

In this manner, the control unit 170 performs control such that an emergency information item (presence information) for confirming the presence of the information processing device whose disconnection is detected is transmitted to other information processing devices belonging to a network other than the network to which the information processing device 100 belongs. In addition, the control unit 170 performs control such that, when the presence information (response information) responding to the emergency information item is received, disconnection information indicating the fact that the presence of the information processing device whose disconnection is detected is confirmed is output in the other network.

[Operation Example of Information Processing Device (Relay Station of Emergency Information Item)]

Figure 13:
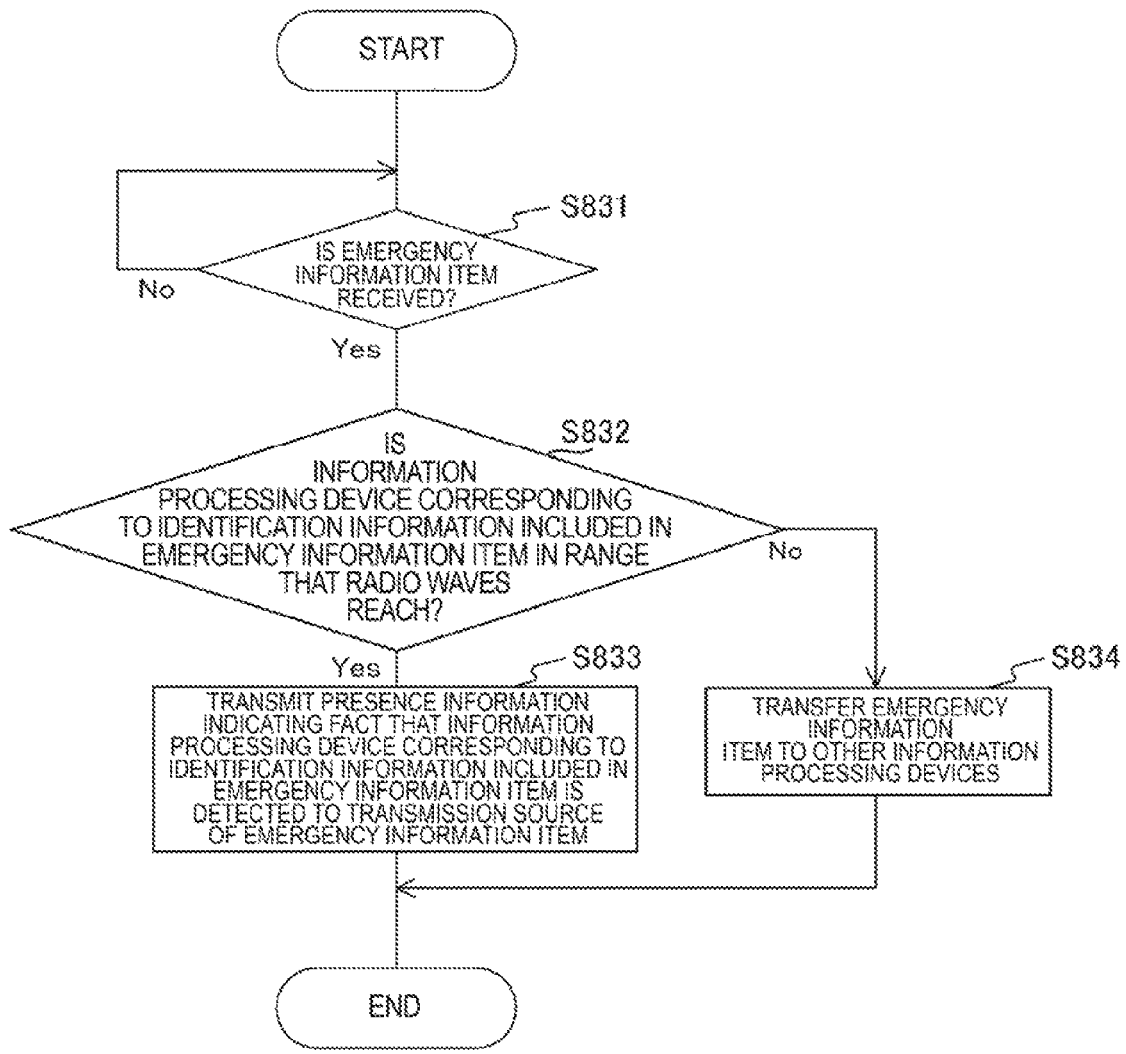
FIG. 13 is a flowchart illustrating exemplary processing procedures of a disconnection information output process performed by the information processing device 100 in the second embodiment of the present technology.

FIG. 13 is a flowchart illustrating exemplary processing procedures of a disconnection information output process performed by the information processing device 100 in the second embodiment of the present technology. FIG. 13 illustrates an example when the information processing device 100 receives an emergency information item for detecting an information processing device disconnected from a network.

First, the control unit 170 determines whether an emergency information item (for example, included in the beacon 600 illustrated in FIG. 10) is received from other information processing devices (Step S831). Then, when no emergency information item is received (Step S831), monitoring is continuously performed.

When the emergency information item is received (Step S831), the control unit 170 determines whether an information processing device corresponding to identification information included in the emergency information item is in a range that radio waves reach (Step S832). Then, when the information processing device is in the range that radio waves reach (Step S832), the control unit 170 transmits presence information indicating the fact that the information processing device is detected to an information processing device (a transmission source) that has initially transmitted the emergency information item (Step S833).

On the other hand, when the information processing device corresponding to identification information included in the emergency information item is not in the range that radio waves reach (Step S832), the control unit 170 transfers the emergency information item to other information processing devices (Step S834).

In this manner, the control unit 170 receives the emergency information item (specific information) transmitted from another network. In this case, when the presence of the information processing device whose disconnection is detected in the other network is confirmed in the network to which the information processing device 100 belongs, the control unit 170 transmits information (presence information) including the fact that the presence is confirmed.

Note that, in this example, a case in which the emergency information item is transmitted by the information processing device in the network, and thus the information processing device disconnected from the network is searched for is exemplified. However, the emergency information item is transmitted by the information processing device disconnected from the network, and thus the information processing device in the network may be notified of the presence thereof.

Here, a case in which, when a child is away from a group, the separation is detected and notified of will be exemplified. For example, it is assumed that a child is captured by an image capturing device to monitor separation of the child. In this case, it may be impossible to perform monitoring beyond a range (an image capturing range) in which capturing is possible by the image capturing device. In addition, for example, it is assumed that a voice of a child is acquired by a sound acquisition device to monitor separation of the child. In this case, it may be impossible to perform monitoring beyond a range in which acquiring of a sound is possible by the sound acquisition device. In addition, for example, it is assumed that a motion of a child is acquired by a vibration detecting device to monitor separation of the child. For example, it is assumed a case in which separation of a child who plays on a mat including the vibration detecting device is monitored. In this case, it may be impossible to perform monitoring beyond a range (for example, on the mat) in which detecting of vibration is possible by the vibration detecting device. That is, in such cases, it may be impossible to easily extend a range in which monitoring is possible.

In addition, for example, it is assumed that a child is allowed to possess a terminal, and radio waves from a base station are used to monitor separation of the child through wireless communication. In this case, compared to the image capturing device, the sound acquisition device, and the vibration detecting device described above, a monitoring range thereof increases, but it may be impossible to exceed a radio wave reaching range of a base station of a network. In addition, since a position of the base station configured to transmit radio waves is fixed, it may be impossible to easily move. In addition, a use in a temporary place or a use while moving is assumed to be difficult.

On the other hand, in the embodiment of the present technology, an information processing device that is to be disconnected is detected using a radio wave strength of information processing devices belonging to the network built through autonomous wireless communication of a plurality of information processing devices. Accordingly, it is possible to easily support to a case in which a range in which monitoring is possible is changed or extended.

In addition, in the embodiment of the present technology, in the network composed of devices using any method of recognizing a relative positional relation with other devices, it is possible to manage separation of a member of user groups who possess devices belonging to the network. In addition, it is possible to notify the user of the relative positional relation with other devices.

Accordingly, for example, it is possible to recognize positions of group members in a wide area and prevent separation from the area. In addition, even when the area is changed, it is possible to prevent separation of group members and easily recognize a current relative place.

For example, it is possible to help lost child prevention in a school event in which guidance of a large number of children is necessary or a place such as a shopping mall in which children can freely move in a wide area.

<3. Application Example>

The technology according to the disclosure can be applied to various products. For example, the information processing devices 100, 210, 220, 230, 240, 510, 520, and 530 may be realized as mobile terminals such as smartphones, tablet PCs (Personal Computers), notebook PCs, portable game terminals, or digital cameras, fixed-type terminals such as television receivers, printers, digital scanners, or network storages, or car-mounted terminals such as car navigation devices. In addition, the information processing devices 100, 210, 220, 230, 240, 510, 520, and 530 may be realized as terminals that perform M2M (Machine to Machine) communication (also referred to as MTC (Machine Type Communication) terminals) such as smart meters, vending machines, remotely controlled surveillance devices, or POS (Point Of Sale) terminals. Furthermore, the information processing devices 100, 210, 220, 230, 240, 510, 520, and 530 may be wireless communication modules mounted in such terminals (for example, integrated circuit modules configured by one die).

[3-1. First Application Example]

Figure 14:
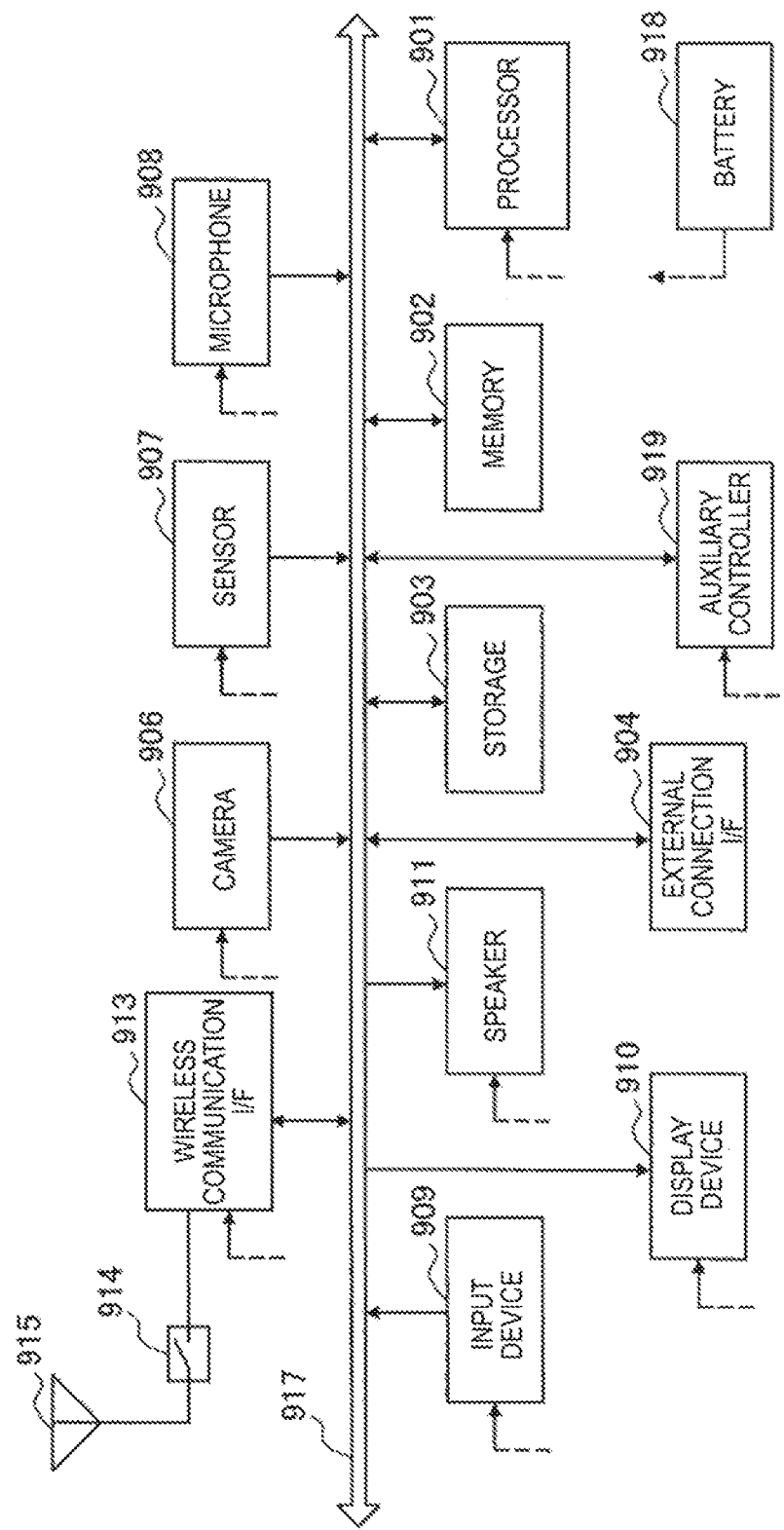
FIG. 14 is a block diagram showing an example of a schematic configuration of a smartphone.

FIG. 14 is a block diagram showing an example of a schematic configuration of a smartphone 900 to which an embodiment of the technology of the present disclosure can be applied. The smartphone 900 includes a processor 901, a memory 902, a storage 903, an externally connected interface 904, a camera 906, a sensor 907, a microphone 908, a input device 909, a display device 910, a speaker 911, a wireless communication interface 913, an antenna switch 914, an antenna 915, a bus 917, a battery 918, and an auxiliary controller 919.

The processor 901 may be, for example, a CPU (Central Processing Unit) or an SoC (System on Chip), and controls functions of an application layer and other layers of the smartphone 900. The memory 902 includes a RAM (Random Access Memory) and a ROM (Read Only Memory), and stores programs executed by the processor 901 and data. The storage 903 can include a storage medium such as a semiconductor memory or a hard disk. The externally connected interface 904 is an interface for connecting an externally attached device such as a memory card or a USB (Universal Serial Bus) device to the smartphone 900.

The camera 906 has an image sensor, for example, a CCD (Charge Coupled Device) or a CMOS (Complementary Metal Oxide Semiconductor), to generate captured images. The sensor 907 can include a sensor group including, for example, a positioning sensor, a gyro sensor, a geomagnetic sensor, an acceleration sensor, and the like. The microphone 908 converts sounds input to the smartphone 900 into audio signals. The input device 909 includes, for example, a touch sensor that detects touches on a screen of the display device 910, a key pad, a keyboard, buttons, switches, and the like, to receive manipulations or information inputs from a user. The display device 910 has a screen such as a liquid crystal display (LCD), or an organic light emitting diode (OLED) display to display output images of the smartphone 900. The speaker 911 converts audio signals output from the smartphone 900 into sounds.

The wireless communication interface 913 supports one or more wireless LAN standards of IEEE 802.11a, 11b, 11g, 11n, 11ac, and 11ad, to execute the wireless LAN communication. The wireless communication interface 913 can communicate with another device via a wireless LAN access point in an infrastructure mode. In addition, the wireless communication interface 913 can directly communicate with another device in an ad hoc mode. The wireless communication interface 913 can typically include a baseband processor, an RF (Radio Frequency) circuit, a power amplifier, and the like. The wireless communication interface 913 may be a single-chip module on which a memory that stores a communication control program, a processor that executes the program, and a relevant circuit are integrated. The wireless communication interface 913 may support another kind of wireless communication scheme such as a cellular communication scheme, a short-range wireless communication scheme, or a proximity wireless communication scheme in addition to the wireless LAN scheme. The antenna switch 914 switches a connection destination of the antenna 915 for a plurality of circuits (for example, circuits for different wireless communication schemes) included in the wireless communication interface 913. The antenna 915 has a single or a plurality of antenna elements (for example, a plurality of antenna elements constituting a MIMO antenna), and is used for transmission and reception of wireless signals from the wireless communication interface 913.

Note that the smartphone 900 may include a plurality of antennas (for example, antennas for a wireless LAN or antennas for a proximity wireless communication scheme, or the like), without being limited to the example of FIG. 14. In this case, the antenna switch 914 may be omitted from the configuration of the smartphone 900.

The bus 917 connects the processor 901, the memory 902, the storage 903, the externally connected interface 904, the camera 906, the sensor 907, the microphone 908, the input device 909, the display device 910, the speaker 911, the wireless communication interface 913, and the auxiliary controller 919 to one another. The battery 918 supplies electric power to each of the blocks of the smartphone 900 shown in FIG. 14 via power supply lines partially indicated by dashed lines in the drawing. The auxiliary controller 919 causes, for example, minimum necessary functions of the smartphone 900 to be operated in a sleep mode.

Also, in the smartphone 900 illustrated in FIG. 14, the detection unit 150 and the control unit 170, which are described by using FIG. 2, may be implemented in the wireless communication interface 913. Also, at least a part of these functions may be implemented in the processor 901 or the auxiliary controller 919.

Note that, when the processor 901 executes an access point function at an application level, the smartphone 900 may be operated as a wireless access point (a software AP). In addition, the wireless communication interface 913 may include a wireless access point function.

[3-2. Second Application Example]

Figure 15:
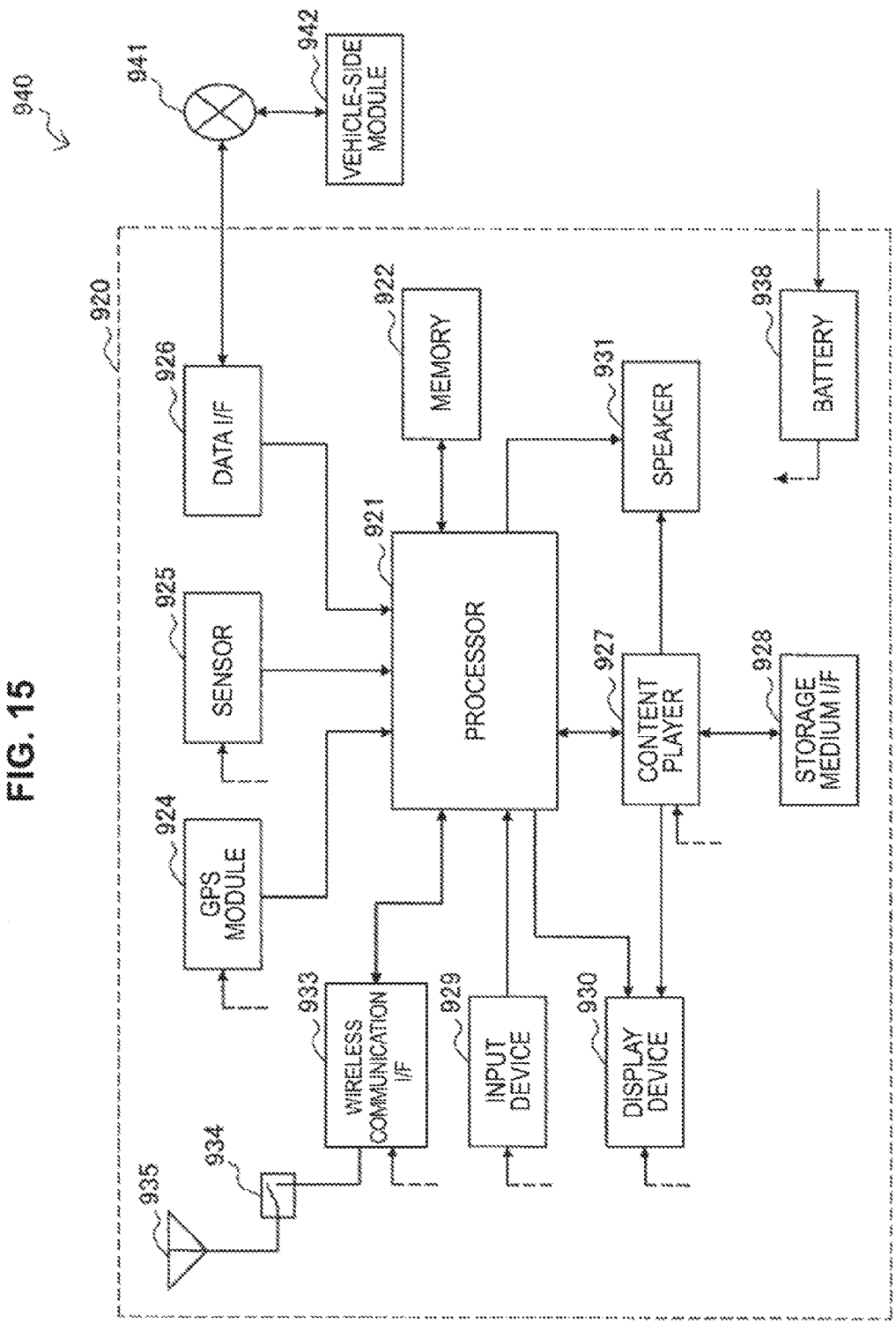
FIG. 15 is a block diagram showing an example of a schematic configuration of a car navigation device.

FIG. 15 is a block diagram showing an example of a schematic configuration of a car navigation device 920 to which an embodiment of the technology of the present disclosure can be applied. The car navigation device 920 includes a processor 921, a memory 922, a GPS (Global Positioning System) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or an SoC controlling a navigation function and other functions of the car navigation device 920. The memory 922 includes a RAM and a ROM storing programs executed by the processor 921 and data.

The GPS module 924 measures a position of the car navigation device 920 (for example, latitude, longitude, and altitude) using GPS signals received from a GPS satellite. The sensor 925 can include a sensor group including, for example, a gyro sensor, a geomagnetic sensor, a pneumatic sensor, and the like. The data interface 926 is connected to a car-mounted network 941 via, for example, a terminal that is not shown to acquire data generated on the vehicle side such as car speed data.

The content player 927 reproduces content stored in a storage medium (for example, a CD or a DVD) inserted into the storage medium interface 928. The input device 929 includes, for example, a touch sensor that detects touches on a screen of the display device 930, buttons, switches, and the like to receive manipulations or information inputs from a user. The display device 930 has a screen such as an LCD or an OLED display to display images of the navigation function or reproduced content. The speaker 931 outputs sounds of the navigation function or reproduced content.

The wireless communication interface 933 supports one or more wireless LAN standards of IEEE 802.11a, 11b, 11g, 11n, 11ac, and 11ad, to execute wireless LAN communication. The wireless communication interface 933 can communicate with another device via a wireless LAN access point in the infrastructure mode. In addition, the wireless communication interface 933 can directly communicate with another device in an ad hoc mode. The wireless communication interface 933 can typically have a baseband processor, an RF circuit, a power amplifier, and the like. The wireless communication interface 933 may be a single-chip module on which a memory that stores a communication control program, a processor that executes the program, and a relevant circuit are integrated. The wireless communication interface 933 may support another kind of wireless communication scheme such as a short-range wireless communication scheme, a proximity wireless communication scheme, or the cellular communication scheme in addition to the wireless LAN scheme. The antenna switch 934 switches a connection destination of the antenna 935 for a plurality of circuits included in the wireless communication interface 933. The antenna 935 has a single or a plurality of antenna elements and is used for transmission and reception of wireless signals from the wireless communication interface 933.

Note that the car navigation device 920 may include a plurality of antennas, without being limited to the example of FIG. 15. In this case, the antenna switch 934 may be omitted from the configuration of the car navigation device 920.

The battery 938 supplies electric power to each of the blocks of the car navigation device 920 shown in FIG. 15 via power supply lines partially indicated by dashed lines in the drawing. In addition, the battery 938 accumulates electric power supplied from the vehicle.

In the car navigation device 920 illustrated in FIG. 15, the detection unit 150 and the control unit 170, which are described by using FIG. 2, may be implemented in the wireless communication interface 933. Also, at least a part of these functions may be implemented in the processor 921.

An embodiment of the technology of the present disclosure may be realized as an in-vehicle system (or a vehicle) 940 including one or more blocks of the above-described car navigation device 920, an in-vehicle network 941, and a vehicle-side module 942. The vehicle-side module 942 generates vehicle-side data such as a vehicle speed, the number of engine rotations, or failure information and outputs the generated data to the in-vehicle network 941.

The above-described embodiments are examples for embodying the present technology, and matters in the embodiments each have a corresponding relationship with subject matter in the claims. Likewise, the matters in the embodiments and the subject matter in the claims denoted by the same names have a corresponding relationship with each other. However, the present technology is not limited to the embodiments, and various modifications of the embodiments may be embodied in the scope of the present technology without departing from the spirit of the present technology.

The processing sequences that are described in the embodiments described above may be handled as a method having a sequence of sequences or may be handled as a program for causing a computer to execute the sequence of sequences and recording medium storing the program. As the recording medium, a CD (Compact Disc), an MD (MiniDisc), and a DVD (Digital Versatile Disk), a memory card, and a Blu-ray disc (registered trademark) can be used.

In addition, the effects described in the present specification are not limiting but are merely examples, and there may be additional effects.

Additionally, the present technology may also be configured as below.

(1)

An information processing device including:

a detection unit configured to detect an information processing device that is disconnected from a network built through autonomous wireless communication of a plurality of information processing devices; and a control unit configured to perform control such that information about the detected information processing device is output as disconnection information.

(2)

The information processing device according to (1), wherein the detection unit detects whether the information processing device is disconnected from the network, and wherein the control unit performs control such that, when the disconnection is detected, the disconnection information indicating a fact that the information processing device is disconnected is output.

(3)

The information processing device according to (2), wherein the control unit performs control such that, when the disconnection is detected, information for the information processing device to return to the network is output.

(4)

The information processing device according to (3), wherein the control unit performs control such that, as the information for returning, at least one of a label indicating an advancing direction for the information processing device to return to the network, and a label indicating a relative positional relation between the information processing device and other information processing devices belonging to the network is displayed.

(5)

The information processing device according to (1), wherein the detection unit detects whether another information processing device belonging to the network is disconnected from the network, and wherein the control unit performs control such that, when the disconnection is detected, the disconnection information indicating a fact that the other information processing device is disconnected is output.

(6)

The information processing device according to any of (1) to (5), wherein the control unit performs control such that information about a relative position with other information processing devices belonging to the network is acquired, and a relative positional relation between the information processing device and the detected information processing device based on the information is displayed.

(7)

The information processing device according to (6), wherein the control unit performs control such that, based on position information about a position of the information processing device, labels indicating the information processing device and the detected information processing device are arranged and displayed on a map including the position of the information processing device.

(8)

The information processing device according to any of (1) to (7), wherein the control unit performs control such that specific information for confirming presence of the detected information processing device is transmitted to another information processing device belonging to a network other than the network.

(9)

The information processing device according to (8), wherein, when the presence of the detected information processing device is confirmed in the other network, the other information processing device transmits information including a fact that the presence of the detected information processing device is confirmed as response information for the specific information, and wherein the control unit performs control such that, when the response information is received, the disconnection information indicating the fact that the presence of the detected information processing device is confirmed in the other network is output.

(10)

The information processing device according to any of (1) to (9), wherein the detection unit detects an information processing device that is not disconnected from the network but is likely to be disconnected, and wherein the control unit performs control such that, when the information processing device that is likely to be disconnected is detected, the disconnection information indicating a fact that the information processing device that is likely to be disconnected is detected is output.

(11)

The information processing device according to (10), wherein, when there is a first information processing device whose signal strength is less than a threshold and there is no second information processing device whose signal strength is equal to or greater than a threshold among other information processing devices belonging to the network, the detection unit detects the information processing device as the information processing device that is likely to be disconnected.

(12)

The information processing device according to any of (1) to (11), wherein the detection unit detects the information processing device that is disconnected using list information in which identification information for identifying each of the plurality of information processing devices is retained.

(13)

The information processing device according to (12), wherein the list information includes the identification information about at least one information processing device of an information processing device that is able to directly communicate with the information processing device and an information processing device that is able to perform communication through an information processing device other than the information processing device.

(14)

The information processing device according to (12) or (13), wherein, when an information processing device disconnected from the network is detected using the list information, the control unit confirms presence of the detected information processing device based on presence information that is information received from another information processing device belonging to a network other than the network, is transmitted in response to specific information for confirming the presence of the detected information processing device and indicates a fact that a beacon from the detected information processing device is detected.

(15)

The information processing device according to any of (1) to (14), wherein, when a beacon is not detected from any of the plurality of information processing devices for a predetermined time, the detection unit detects that the information processing device is disconnected from the network.

(16)

An information processing method including:

a detecting procedure of detecting an information processing device that is disconnected from a network built through autonomous wireless communication of a plurality of information processing devices; and a controlling procedure of performing control such that information about the detected information processing device is output as disconnection information.

(17)

A program causing a computer to execute:

a detecting procedure of detecting an information processing device that is disconnected from a network built through autonomous wireless communication of a plurality of information processing devices; and a controlling procedure of performing control such that information about the detected information processing device is output as disconnection information.

REFERENCE SIGNS LIST 10, 20 communication system
100, 210, 220, 230, 240, 510, 520, 530 information processing device
110 posture detection unit
120 image capturing unit
130 sound acquisition unit
140 wireless communication unit
150 detection unit
160 operation accepting unit
161 to 163, 242 to 244 operation member
170 control unit
171 storage unit
180, 241 display unit
190 voice output unit
200, 500 network
900 smartphone
901 processor
902 memory
903 storage
904 externally connected interface
906 camera
907 sensor
908 microphone
909 input device
910 display device
911 speaker
913 wireless communication interface
914 antenna switch
915 antenna
917 bus
918 battery
919 auxiliary controller
920 car navigation device
921 processor
922 memory
924 GPS module
925 sensor
926 data interface
927 content player
928 storage medium interface
929 input device
930 display device
931 speaker
933 wireless communication interface
934 antenna switch
935 antenna
938 battery
941 car-mounted network
942 vehicle-side module

The invention claimed is:

1. A first information processing device, comprising:
a detection unit configured to detect a second information processing device that is disconnected from a first network built through wireless communication of a plurality of information processing devices that include at least the first information processing device and the second information processing device; and
a control unit configured to:
output first information about the detected second information processing device as disconnection information,
acquire second information about a relative position of the second information processing device with other information processing devices of the plurality of information processing devices associated with the first network, and
display a relative positional relation between the first information processing device and the detected second information processing device based on the acquired second information.

2. The first information processing device according to claim 1,
wherein the detection unit is further configured to detect disconnection of the second information processing device from the first network, and
wherein the control unit is further configured to output the disconnection information indicating that the second information processing device is disconnected, based on the detected disconnection.

3. The first information processing device according to claim 2,
wherein the control unit is further configured to output third information for the detected second information processing device to return to the first network, based on the detected disconnection.

4. The first information processing device according to claim 3,
wherein the control unit is further configured to display at least one of a first label indicating an advancing direction for the second information processing device to return to the first network, or a second label indicating the relative positional relation between the second information processing device and the other information processing devices associated with the first network, as the third information to return to the first network.

5. The first information processing device according to claim 1,
wherein the detection unit is further configured to detect disconnection of a third information processing device, belonging to the first network, from the first network, and
wherein the control unit is further configured to output the disconnection information indicating that the third information processing device is disconnected, based on the detected disconnection of the third information processing device.

6. The first information processing device according to claim 1,
wherein the control unit is further configured to arrange and display, based on position information about a position of the first information processing device, labels indicating the first information processing device and the detected second information processing device on a map including the position of the first information processing device.

7. The first information processing device according to claim 1,
wherein the control unit is further configured to transmit specific information, that confirms presence of the detected second information processing device, to a third information processing device belonging to a second network other than the first network.

8. The first information processing device according to claim 7,
wherein, based on a confirmation of the presence of the detected second information processing device in the second network, the control unit is further configured to receive, from the third information processing device, fourth information indicating that the presence of the detected second information processing device is confirmed, as response information for the specific information, and
wherein the control unit is further configured to output the disconnection information indicating that the presence of the detected second information processing device is confirmed in the second network, based on the received response information.

9. The first information processing device according to claim 1,
wherein the detection unit is further configured to detect a third information processing device that is connected to the first network but is likely to be disconnected, and
wherein the control unit is further configured to output the disconnection information indicating that the third information processing device is likely to be disconnected, based on the detection of the third information processing device that is likely to be disconnected.

10. The first information processing device according to claim 9,
wherein, based on a fourth information processing device for which a signal strength is less than a threshold and in absence of a fifth information processing device for which the signal strength is equal to or greater than the threshold, the detection unit is further configured to detect the third information processing device as an information processing device that is likely to be disconnected.

11. The first information processing device according to claim 1,
wherein the detection unit is further configured to detect the second information processing device that is disconnected, based on list information that includes identification information to identify each of the plurality of information processing devices.

12. The first information processing device according to claim 11,
wherein the list information includes the identification information about at least a third information processing device that is able to directly communicate with the first information processing device and a fourth information processing device that is able to communicate through a fifth information processing device other than the third information processing device.

13. The first information processing device according to claim 11,
wherein, based on a detection of a third information processing device disconnected from the first network based on the list information, the control unit is further configured to transmit a confirmation of presence of the detected third information processing device based on presence information that is information received from a fourth information processing device belonging to a second network other than the first network, in response to specific information that confirms the presence of the detected third information processing device and further indicates that a beacon from the detected third information processing device is detected.

14. The first information processing device according to claim 1,
wherein, the detection unit is further configured to detect that the second information processing device is disconnected from the first network, in absence of detection of a beacon from at least one of the plurality of information processing devices for a time interval.

15. An information processing method, comprising:
in a first information processing device:
detecting a second information processing device that is disconnected from a network built through wireless communication of a plurality of information processing devices that include at least the first information processing device and the second information processing device;
outputting first information about the detected second information processing device as disconnection information;
acquiring second information about a relative position of the second information processing device with other information processing devices of the plurality of information processing devices associated with the network; and
displaying a relative positional relation between the first information processing device and the detected second information processing device based on the acquired second information.

16. A non-transitory computer-readable medium having stored thereon, computer-executable instructions for causing a first information processing device to execute operations, the operations comprising:
detecting a second information processing device that is disconnected from a network built through wireless communication of a plurality of information processing devices that includes at least the first information processing device and a second information processing device;
outputting first information about the detected second information processing device as disconnection information;
acquiring second information about a relative position of the detected second information processing device with other information processing devices of the plurality of information processing devices associated with the network; and
displaying a relative positional relation between the first information processing device and the detected second information processing device based on the acquired second information.

17. A first information processing device, comprising:
a detection unit configured to detect a second information processing device that is disconnected from a network built through wireless communication of a plurality of information processing devices that include at least the first information processing device and the second information processing device;
a control unit configured to output first information about the detected second information processing device as disconnection information, wherein the detection unit is further configured to detect a third information processing device that is connected to the network but is likely to be disconnected, and wherein the control unit is further configured to output the disconnection information indicating that the third information processing device is likely to be disconnected is detected, based on the detection of the third information processing device.

18. The first information processing device according to claim 17, wherein, based on a fourth information processing device for which a signal strength is less than a threshold and in absence of a fifth information processing device for which the signal strength is equal to or greater than the threshold, the detection unit is further configured to detect the third information processing device as an information processing device that is likely to be disconnected.

* * * * *